US008920005B2

(12) United States Patent
Ahn et al.

(10) Patent No.: US 8,920,005 B2
(45) Date of Patent: Dec. 30, 2014

(54) LIGHT EMITTING DIODE TYPE ILLUMINATING MODULE

(76) Inventors: In-Kyu Ahn, Hwaseong-Si (KR); Seul-Ki Lee, Gwangju (KR)

( * ) Notice: Subject to any disclaimer, the term of this patent is extended or adjusted under 35 U.S.C. 154(b) by 346 days.

(21) Appl. No.: 13/443,499

(22) Filed: Apr. 10, 2012

(65) Prior Publication Data

US 2013/0063937 A1 Mar. 14, 2013

(30) Foreign Application Priority Data

Sep. 8, 2011 (KR) ........................ 10-2011-0091173

(51) Int. Cl.
*B60Q 1/06* (2006.01)
*F21V 29/00* (2006.01)

(Continued)

(52) U.S. Cl.
CPC ........... *F21V 29/2293* (2013.01); *F21V 29/246* (2013.01); *F21V 29/262* (2013.01); *F21V 31/005* (2013.01); *F21V 21/088* (2013.01); *F21V 3/04636* (2013.01); *F21V 15/011* (2013.01); *F21V 17/101* (2013.01); *F21V 19/004* (2013.01); *F21V 19/0055* (2013.01); *F21V 23/006* (2013.01); *F21V 23/008* (2013.01); *F21V 23/023* (2013.01); *F21S 2/00* (2013.01); *F21V 21/045* (2013.01); *F21S 8/03* (2013.01); *F21V 29/2287* (2013.01); *F21Y 2105/001* (2013.01); *F21V 21/30* (2013.01); *F21Y 2101/02* (2013.01); *F21W 2131/103* (2013.01); *F21K 9/13* (2013.01)
USPC .. 362/373; 362/294; 362/311.02; 362/249.02

(58) Field of Classification Search
CPC ... F21V 29/004; F21V 29/2293; F21V 29/22; F21V 29/2287; F21V 29/262; F21V 29/265; F21V 31/00; F21V 31/005; F21V 15/011
USPC .................... 362/373, 294, 218, 547, 349.02, 362/311.02, 267, 363, 249.02; 977/742
See application file for complete search history.

(56) References Cited

U.S. PATENT DOCUMENTS 5,561,346 A * 10/1996 Byrne ........................... 313/512
7,575,346 B1 * 8/2009 Horng et al. .................. 362/373

(Continued)

FOREIGN PATENT DOCUMENTS

KR 10-0910633 7/2009
KR 10-0969525 7/2010

(Continued)

*Primary Examiner* — Ismael Negron
*Assistant Examiner* — Erin Kryukova
(74) *Attorney, Agent, or Firm* — Rabin & Berdo, P.C.

(57) ABSTRACT

Disclosed herein is an LED-type illuminating module, which independently functions as an illuminating apparatus and which is used to constitute various kinds of illuminating apparatuses having desired outputs by providing a plurality of the LED-type illuminating modules on a module fixing plate 8 of a predetermined area, including: a light transmission or diffusion plate; an LED substrate on which LEDs are fixed at regular intervals by soldering; a radiator formed by die-casting a light metal alloy; a waterproof ring; a plurality of radiating plates made of a light metal alloy; a housing formed by injection-molding a conductive polymer resin material; a waterproof packing; and a power supply converter.

9 Claims, 17 Drawing Sheets

(51) Int. Cl.

| | |
|---|---|
| ***F21V 3/00*** | (2006.01) |
| ***F21V 5/00*** | (2006.01) |
| ***F21S 4/00*** | (2006.01) |
| ***F21V 21/00*** | (2006.01) |
| ***F21V 31/00*** | (2006.01) |
| ***F21V 21/088*** | (2006.01) |
| ***F21V 15/01*** | (2006.01) |
| ***F21V 17/10*** | (2006.01) |
| ***F21V 19/00*** | (2006.01) |
| ***F21V 23/00*** | (2006.01) |
| ***F21V 23/02*** | (2006.01) |
| ***F21S 2/00*** | (2006.01) |
| ***F21V 21/04*** | (2006.01) |
| ***F21S 8/00*** | (2006.01) |
| *F21Y 105/00* | (2006.01) |
| *F21V 21/30* | (2006.01) |
| *F21Y 101/02* | (2006.01) |
| *F21W 131/103* | (2006.01) |
| *F21K 99/00* | (2010.01) |

(56) References Cited

U.S. PATENT DOCUMENTS

| | | | | |
|---|---|---|---|---|
| 7,611,264 | B1 * | 11/2009 | Chang et al. | 362/249.02 |
| 8,016,453 | B2 * | 9/2011 | Xiao et al. | 362/247 |
| 8,403,542 | B2 * | 3/2013 | Chu | 362/373 |
| 8,541,933 | B2 * | 9/2013 | Chowdhury et al. | 313/46 |
| 2006/0215408 | A1 * | 9/2006 | Lee | 362/294 |
| 2009/0027889 | A1 * | 1/2009 | Kang et al. | 362/294 |
| 2009/0116233 | A1 * | 5/2009 | Zheng et al. | 362/234 |
| 2010/0149818 | A1 * | 6/2010 | Ruffin | 362/294 |
| 2010/0157570 | A1 * | 6/2010 | Xiao et al. | 362/35 |
| 2010/0259935 | A1 * | 10/2010 | Scordino et al. | 362/294 |
| 2010/0277933 | A1 * | 11/2010 | Chen | 362/432 |
| 2011/0019402 | A1 * | 1/2011 | Mo | 362/235 |
| 2011/0164424 | A1 * | 7/2011 | Breen et al. | 362/296.01 |
| 2012/0033419 | A1 * | 2/2012 | Kim et al. | 362/235 |

FOREIGN PATENT DOCUMENTS

| | | |
|---|---|---|
| KR | 10-2011-0036367 | 4/2011 |
| KR | 10-1033989 | 5/2011 |
| KR | 10-1058901 | 8/2011 |

* cited by examiner

LIGHT EMITTING DIODE TYPE ILLUMINATING MODULE

BACKGROUND OF THE INVENTION

1. Technical Field

The present invention relates to a light emitting diode type illuminating module having a capacity of from several watts to several tens of watts, and, more particularly, to a multipurpose light emitting diode type illuminating module which can greatly improve the heat radiation performance of an illuminating apparatus and can reduce the weight and size thereof because light emitting diodes (LEDs) generating a small amount of heat and having low power consumption as a light source are used.

2. Description of the Related Art

Generally, conventional security lights and street lights use a mercury or sodium lamp as their light source. Therefore, they are problematic in that energy consumption is high for lightness, and in that the lifecycle is short, so the light intensity rapidly decreases, thereby requiring periodic control.

Particularly, since the above-mentioned lights use mercury gas, there is a problem in that they cause environmental pollution when they are discarded.

Therefore, recently, illumination lamps, which use a light emitting diode (LED) having low power consumption and a long lifecycle as a light source, have been developed and appeared on the market.

In this case, the light emitting diode (LED), which is a semiconductor device having the advantages of rapid response speed, low power consumption and long lifecycle, produces minority carriers (electrons or holes) using a P-N junction, and emits light because of the recombination of the minority carriers. Therefore, the light emitting diode (LED) is advantageous in that it can greatly reduce the consumption of electric energy because its power consumption is about 1/10 that of a conventional incandescent bulb or halogen bulb.

Particularly, in the case of illuminating apparatuses requiring a large amount of electric power, such as traffic lights, security lights, street lights, floodlights, lights for houses or cattle pens, etc., replacing the sodium or mercury lamps generally used in such an illumination device with light emitting diodes (LEDs) is very effective at reducing power consumption.

However, since conventional illuminating apparatuses using light emitting diodes (LEDs) are difficult to solve the problems of heat radiation, low-capacity light emitting diodes (LEDs) having a power consumption of 1 watt or less have generally been used. In other words, when high-capacity light emitting diodes (called power LEDs) having a power consumption of 1 watt or more, particularly, 2~10 watts are used, a large amount of heat is generated. In this case, when the heat radiation performance thereof is low, peripheral devices are damaged by heat and the lifecycle thereof is rapidly shortened, so that these conventional illuminating devices cannot practically serve as illuminators.

Meanwhile, such illuminating apparatuses using light emitting diodes (LEDs), for example, security lights or street lights are advantageous compared to security lights or street light using fluorescence in that they have a simple lighting circuit, do not require an inverter circuit and an iron-core ballast, have low power consumption, a long lifecycle and low maintenance costs.

However, such illuminating devices as traffic lights, security lights, street lights, floodlights, lights for houses or cattle pens, lights for sign boards, downlights, etc. are disadvantageous in that their properties are deteriorated by thermal stress and they easily break down.

That is, when the amount of electric current flowing to a plurality of light emitting diodes (LEDs) increases so that they can be operated, the amount of heat generated therefrom increases, thus causing the properties of the illuminating apparatuses to deteriorate and causing the illuminating apparatuses to break down.

For example, such illuminating apparatuses as traffic lights, security lights, street lights, floodlights, lights for houses or cattle pens, lights for sign boards, downlights, room lights, etc., are provided with respective printed circuit boards (PCB) having a control circuit for switching LEDs on and off and a power circuit for externally supplying power to LEDs. The printed circuit board (PCB) malfunctions and breaks down by the thermal stress generated from the LEDs.

Therefore, in illuminating apparatuses such as traffic lights, security lights, street lights, floodlights, lights for houses or cattle pens, lights for sign boards, downlights, etc., there have been many attempts to overcome the thermal stress generated from the LEDs by providing such a radiating plate as a heat sink or a slug made of a metal material having high thermal conductivity. However, in this case, there is a problem in that, due to the metal material constituting the radiating plate, the thickness and volume of the radiating plate increase in order to meet required heat radiating efficiency, which increases the size and weight of each of the illuminating apparatuses.

Moreover, in the case of conventional light emitting diode type illuminating modules or street lights, since it is possible to prevent the entry of moisture only when they are tightly closed, it is difficult to install a cooler for efficient heat radiation. Nevertheless, installing a cooler causes the problem of all kinds of foreign materials including water or moisture being introduced from the exterior into such illuminating apparatuses as traffic lights, security lights, street lights, floodlights, lights for houses or cattle pens, etc.

Meanwhile, when a radiator used in a light emitting diode type illuminating module is formed by die-casting aluminum, there are problems in that the thickness and volume thereof are increased, so that the production cost thereof is increased and the weight thereof cannot be decreased, thus causing the production cost of a lamp stay or a lamp support heavier than a conventional discharge lamp to increase, and in that a previously-installed lamp stay or lamp support must be replaced by another.

Moreover, when a conventional discharge-type security light, floodlight or the like is replaced by a light emitting diode type security, floodlight or the like, the original light does not have a sufficient space in which to install a radiator required by the light emitting diode type security light, floodlight or the like, so that it cannot be directly used and is discarded, thereby causing the problem of a waste of resources.

Further, a conventional radiating structure formed by extruding or die-casting aluminum is somewhat excellent in thermal conductivity, but the heat radiation (thermal diffusion or discharge of heat to air) performance thereof is rapidly lowered in tightly enclosed locations.

For this reason, most radiating structures of LED illuminating apparatuses are formed by extruding or die-casting aluminum even though they have hardly been employed in notebooks or personal computers (PCs). However, they are problematic in that the volume and weight thereof are increased.

Further, conventional radiators using a principle of a heat spreader (called a self-powered heat pump) have lately been applied to high-price products such as notebooks and the like and LED illuminating apparatuses even though they have high performance but a short lifecycle, are expensive and have a large volume. However, they are problematic in that the prices of illuminating apparatuses become excessively expensive when they are used in the illuminating apparatuses.

Further, in conventional radiating structures formed by pressing, laminating and then bundling aluminum thin films, the thermal conductivity thereof is somewhat improved, and the thermal diffusivity thereof is greatly improved. However, they are problematic in that thermal diffusion is restricted in tightly-enclosed spaces, and in that the air layer located at the narrow space between the thin films has a thermal insulating effect. Therefore, it is not preferred that these conventional radiating structures be used in places where a large amount of dust exists.

Meanwhile, when such illuminating apparatuses as traffic lights, security lights, street lights, floodlights, lights for houses or cattle pens, lights for sign boards, downlights, etc. are fabricated using a light emitting diode type illuminating module, there are cases where it is required that the LED-type illuminating module be directly provided with a power supply converter, and, if necessary, there are cases where it is also required that a current controller, a color controller and a power supply converter are individually fabricated, and power sources and signal lines are respectively connected to the LED-type illuminating module.

However, among the above two cases, in the case where a power supply converter is independently and directly provided in the LED-type illuminating module, there is a problem in that the heat generated from the power supply converter provided in the LED-type illuminating module cannot be easily radiated because the power supply converter is installed in a housing formed of general synthetic resin having very low thermal diffusivity and thermal conductivity, and the heat generated from light emitting diodes (LEDs) can also be radiated only by a radiator, thus shortening the lifecycle of the LED-type illuminating module including the power supply converter and the light emitting diodes (LEDs).

Particularly, for example, when the LED-type illuminating module is a high-power illuminating module having a power of 10~20 W, high heat radiation efficiency is required because each of the LEDs generates a very large amount of heat. However, conventionally, similarly to a low-power illuminating module having a power of 8 W or less, heat radiation is carried out only by one radiator integrated with several radiating fins, so that the size of the radiator becomes large or the heat radiation efficiency thereof becomes low at the same size, thereby shortening the lifecycle of the illuminating module itself including light emitting diodes (LEDs).

SUMMARY OF THE INVENTION

Accordingly, the present invention has been devised to solve the above-mentioned problems, and an object of the present invention is to provide an LED-type illuminating module, wherein high-power light emitting diodes (LEDs) having high light efficiency, a small LED disposition area and a high power per LED are used as a light source, a radiating structure for radiating the heat generated from the high power LEDs is composed of a radiating body and a plurality of radiating fins, and the radiating structure, including the radiating body and the radiating fins provided in steps around the radiating body, is made of a magnesium alloy that is a light metal alloy having a thermal diffusivity that is 1.7 times higher than that of aluminum, thereby providing a small high-power LED-type illuminating module, so that users can easily fabricate middle- or high-power illuminating apparatuses having a power of several tens of watts to several hundreds of watts and can use these illumination devices, and the radiation can be carried out in steps by the radiating body and the plurality of radiating fins, with the result that the radiation performance of the high-power LED-type illuminating module can be greatly improved, and the volume of the high-power LED-type illuminating module can be greatly reduced, thereby decreasing the size and weight thereof and greatly decreasing the production cost thereof, and, particularly, when a relatively high-power illuminating apparatus such as a floodlight, security light or the like is fabricated using such LED-type high-power illuminating modules, only a necessary number of the LED-type high-power illuminating modules are directly installed in a support, a reflector, a case or the like to obtain a desired illumination output, thus greatly reducing the production cost thereof and preventing the waste of resources.

Another object of the present invention is to provide an LED-type illuminating module, wherein a housing accommodating a power supply converter is directly and detachably mounted on the top of a radiating body, and the housing is formed by injection-molding a conductive polymer resin containing carbon nanotubes (CNTs) having very high thermal conductivity, so that the heat generated from the power supply converter accommodated in the housing can be easily radiated, and the residual heat in the light emitting diodes (LEDs) can also be radiated by the housing, thereby reducing the production cost of the LED-type illuminating module and decreasing the weight and size thereof.

Still another object of the present invention is to provide an LED-type illuminating module, wherein, in the case of such high-power illuminating apparatuses as floodlights, security lights, street lights, lights for houses or cattle pens, lights for factories and the like which require several LED-type illuminating modules, each of the LED-type illuminating modules is easily fixed on a module plate using elastic fasteners, and in the case of such high-power illumination devices as lights for stairs, lights for spectacles, lights for sign boards, downlights and the like which require that one LED-type illuminating module be installed in the form of a bulb, a spiral socket is easily fixed and mounted on the housing or a light transmission or diffusion plate, so that the compatibility of the LED-type illuminating module can be improved, so that the LED-type illuminating module can be applied to various kinds of illuminating apparatuses.

In order to accomplish the above object, an aspect of the present invention provides an LED-type illuminating module, which independently functions as an illuminating apparatus and which is used to constitute various kinds of illuminating apparatuses having the desired outputs by providing the plurality of LED-type illuminating modules on a module fixing plate having a predetermined area, comprising: a light transmission or diffusion plate (called a lens) which is provided at a bottom of a radiator by ultrasonic fusion-bonding, which transmits and diffuses light emitted from LEDs and which prevents externally-supplied foreign materials and water from gaining entry; an LED substrate which is provided at a bottom of the radiator by screws and which emits light necessary for illumination by controlling a power supply converter; a radiator, which includes a body provided with radiating rods at a top thereof, provided with a groove for mounting the LED substrate and the light transmission or diffusion plate at the bottom thereof and provided with ultrasonically-fused protrusion passing holes at corners thereof, which is formed by die-casting a light metal alloy and which primarily radiate heat generated from LEDs; a waterproof ring which seals a gap between the light transmission or diffusion plate and the radiator; radiating plates which are formed of a light metal alloy in a radial pattern, are flush with the body of the radiator and are fixed in steps by the radiating rods to secondarily radiate the heat generated from the LEDs; a housing which has a cover, which is formed by injection-molding a conductive polymer resin material in a square shape and is detachably coupled with the radiating rods and radiation plates to radiate heat generated from a power supply converter accommodated therein and heat transferred from the radiator and the radiation plates; a waterproof packing which is provided between a periphery of a top of the housing and a periphery of a bottom of the cover to prevent externally-supplied various foreign materials and water from being introduced into the housing; and a power supply converter which is provided in the housing and which serves to supply the power necessary to drive LEDs mounted on the LED substrate.

Here, the light transmission or diffusion plate may be formed by injection-molding polycarbonate (PC) or polymethylmethacrylate (PMMA).

Further, the light transmission or diffusing plate may be provided with a deformation control rod at a center thereof, the deformation control rod serving to prevent the LED substrate from being protruded from the bottom of the radiator towards the light transmission or diffusion plate because of the thermal expansion of the LED substrate.

Further, the radiating rods of the radiator may include cylindrical radiating rods and conical radiating rods, each of the cylindrical radiating rods being provided with a screw coupling hole through which the housing is detachably mounted by screws, and each of the conical radiating rods being provided with a support for supporting the lowermost radiating plate at a middle portion thereof and provided with a support for supporting upper radiating plates.

Further, each of the radiating plates may be provided with holes and recesses for passing radiating rods and supporting rods. The radiating plates are each supported by the supports of the radiating rods and are pressed and supported at positions corresponding to the conical radiating rods on the bottom of the housing. Each of the radiating plates further is provided with: pushrods having two or more heights are formed on the bottom of the housing such that the radiating plates are vertically disposed at regular intervals and fixed between the radiator and the housing; and, with a pair of screw coupler and a pair of screw passing holes which are formed at positions corresponding to the cylindrical radiating rods on the lateral sides of the housing such that the housing is integrally coupled with the radiator by screws.

In this case, among the radiating rods, two cylindrical radiating rods are connected with screws that pass through the screw passing hole and may be formed such that their heights are larger than those of other radiating rods. Further, radiating rod inserting grooves may be formed at a bottom of the housing coming into contact with the two cylindrical radiating rods such that the end of each of the radiating rods is inserted into each of the radiating rod inserting grooves to allow the housing not to rotate.

Further, the number of the radiating plates may be determined by the capacity of the LED-type illuminating module.

Further, the light metal alloy constituting the radiator and the radiating plates may be a magnesium alloy having a thermal diffusion coefficient of 1.3-1.4 [$cm^2$/sec], a thermal conductivity of 60-90 [W/mK], a density of 1.8±0.3 [g/$cm^3$], a melting point of 595 [°C.] and a specific heat of 1.02-1.05 [J/gK].

Further, examples of the light metal alloy constituting the radiator and the radiating plates may include beryllium, titanium, duralumin and a carbon-aluminum composite material.

Further, radiating protrusions may be formed at regular intervals along the periphery of the body of the radiator in order to increase the radiating surface area of the radiator.

Further, lattice-shaped ribs may be formed at the inner bottom of the housing in order to enhance the strength of pushrods and increase the heat radiation area thereof.

In this case, the conductive polymer resin material constituting the housing and the cover may contain carbon nanotubes (CNTs) having a thermal diffusion coefficient of 0.75-0.8 [$cm^2$/sec], a thermal conductivity of 90-150 [W/mK], a density of 1.4±0.2 [g/$cm^3$], a melting point of 105-160 [°C.] and a specific heat of 1.1±0.4 [J/gK].

Further, the power supply converter is integrally attached to the cover of the radiator by an adhesive or epoxy charged in the gap between the power supply converter and the inner side of the cover in a state in which the power supply converter is inserted into the cover.

Further, the cover of the housing may be provided with a threaded plug at a center thereof using an adhesive having both insulative and adhesion properties such that an alternating voltage can be easily supplied to the power supply converter. The single LED-type illuminating module is screwed into a socket.

Further, screw inserting grooves may be formed at regular intervals along a periphery of the body of the radiator or at corners thereof such that each of the LED-type illuminating modules is fixed on the module fixing plate by inserting a part of the body of the radiator into a radiator mounting hole formed on the module fixing plate and simultaneously fixing the body of the radiator using screws or by fixing a thread plug-combined ventilation support having a predetermined shape on the radiator.

Further, a thread plug-combined ventilation support may be provided on a module fixing plate on which several LED-type illuminating modules are installed, such that the module fixing plate is screwed into an illuminating apparatus.

In this case, the thread plug-combined ventilation support includes: a threaded plug serving to supply an alternating voltage to the power supply converter and to integrally provide a single LED-type illuminating module or several LED-type illuminating modules on the module fixing plate by screwing the threaded plug into a socket; and a ventilation support including a body integrally attached to the bottom of the threaded plug and a plurality of legs integrally formed downward along the periphery of the body at regular intervals, each of the legs **12*b*-2** being provided at the lower end thereof with a screw passing hole through which the ventilation support is fixed on the radiator or the module fixing plate by a screw.

Meanwhile, the housing may be integrally provided with open box-shaped protrusions at both lower sides thereof in order to connect an elastic fastener with each of the open box-shaped protrusions or to connect a lighting angle control unit for control the lighting angle of the LED-type illuminating module with the open box-shaped protrusions.

In this case, the elastic faster may be curvedly formed using a steel sheet having predetermined width and length, and may be configured such that the π-shaped elastic part, which is to be inserted into the open box-shaped protrusion, is integrally formed at the inner side of the flat part, and the plate spring part, the lower end of which is to be elastically attached to the module fixing plate with it curved, is integrally formed at the outer side of the flat part, and the plate spring part may be provided with a tool inserting hole for disassembly at the upper portion thereof.

Further, the elastic faster, which is curvedly formed using a steel wire having predetermined diameter and length, includes: a pair of hooks inserted into the open box-shaped protrusion; a pair of flat parts located at the top thereof and covering the upper portion of the open box-shaped protrusion; a pair of spacing parts allowing the hooks to be spaced apart from each other by a predetermined distance; and a pair of spring parts, the lower end of which is elastically attached to the module fixing plate with it curved.

Further, the light angle control unit may include: a pair of elastic fastener, each of which is formed by bending a steel sheet having predetermined width and length in a U-shape, is integrally provided at the lower portion thereof with a coupling part into which the open box-shaped protrusion of the housing is inserted, and is detachably coupled with the open box-shaped protrusion of the housing; a support which is formed by bending a steel sheet having predetermined width and length in an open box-shape, and is integrally provided at both ends thereof with connecting parts, each of the connecting parts being inserted between the free ends of each of the elastic fasters to be connected with the elastic fastener such that its angle can be controlled using a bolt and a butterfly nut; and a fixing plate which is detachably fixed on the center of the support and which serves to detachably fix the lighting angle control unit and the LED-type illuminating module on a wall or the like.

In this case, examples of the LED-type illuminating modules may include a floodlight, a street light, a security light, a light for spectacles, a light for houses or cattle pens, a light for factories, a light for stairs, a light for sign boards, a downlight, and the like.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, preferred embodiments of the present invention will be described in detail with reference to the attached drawings.

Figure 1:
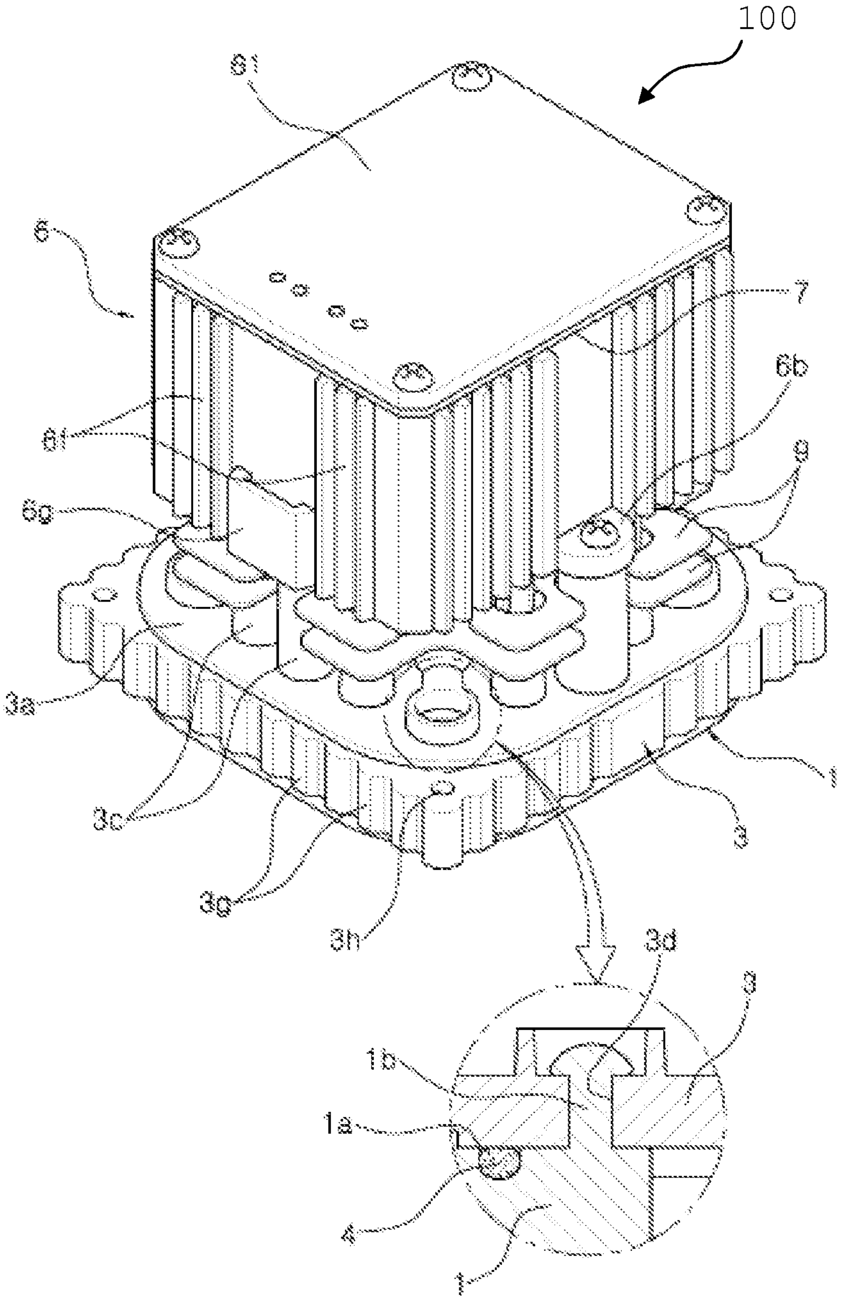
FIG. 1 is a perspective view of an LED-type illuminating module according to the present invention.
Figure 2:
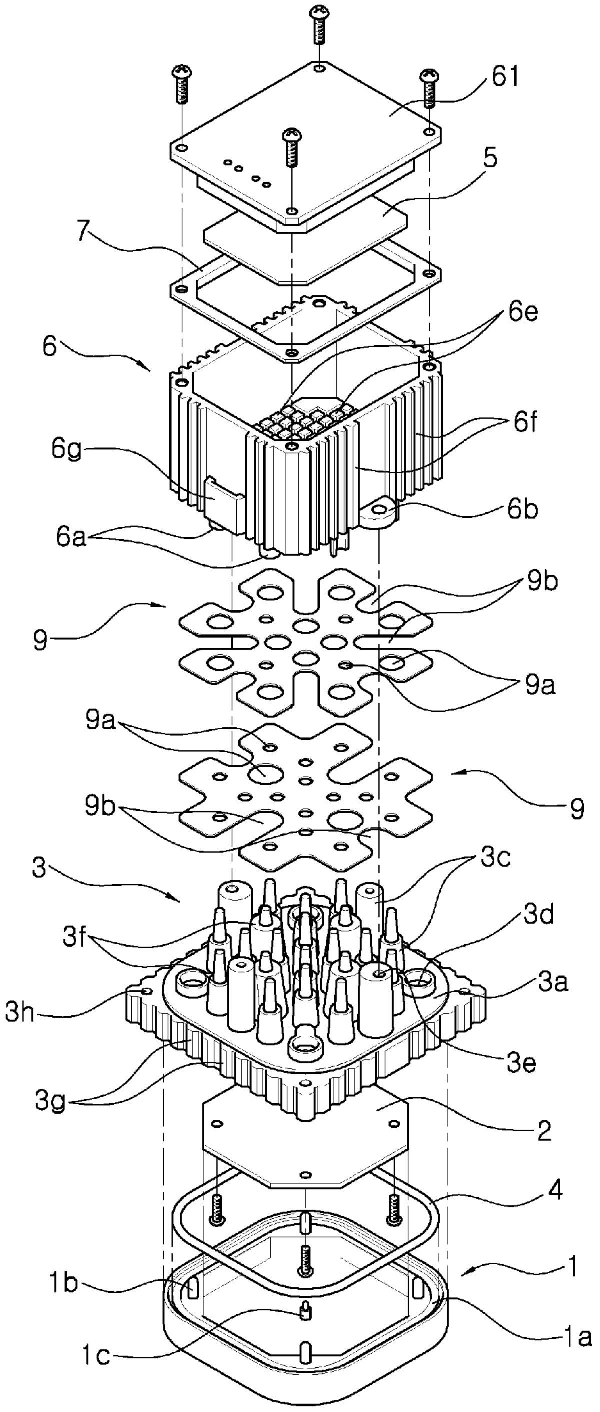
FIG. 2 is an exploded perspective view of an LED-type illuminating module according to the present invention.

First, as shown in FIGS. 1 and 2, the present invention provides an LED-type illuminating module (100), which independently functions as an illuminating apparatus and which is used to constitute various kinds of illuminating apparatuses having desired outputs by providing the plurality of LED-type illuminating modules on a module fixing plate 8 having a predetermined area, including: a light transmission or diffusion plate 1; an LED substrate 2 on which LEDs 2*a* are fixed at regular intervals by soldering; a radiator 3 formed by die-casting a light metal alloy; a waterproof ring 4; a plurality of radiating plates 9 made of a light metal alloy; a housing 6 formed by injection-molding a conductive polymer resin material; a waterproof packing 7; and a power supply converter 5.

In this case, the light transmission or diffusion plate 1 is formed by injection-molding polycarbonate (PC) or polymethylmethacrylate (PMMA) in a square or disk shape, and is provided thereon with a waterproof ring inserting groove 1*a* and a plurality of ultrasonically-fused protrusions 1*b*. Thus, the light transmission or diffusion plate 1 can be integrally coupled with the radiator 3 by fusion-bonding the plurality of protrusions 1*b* using ultrasonic heating without additionally using a screw, can transmit or diffuse the light emitted from the LEDs 2*a*, and can prevent externally-supplied foreign materials or water from being introduced.

Figure 4A:
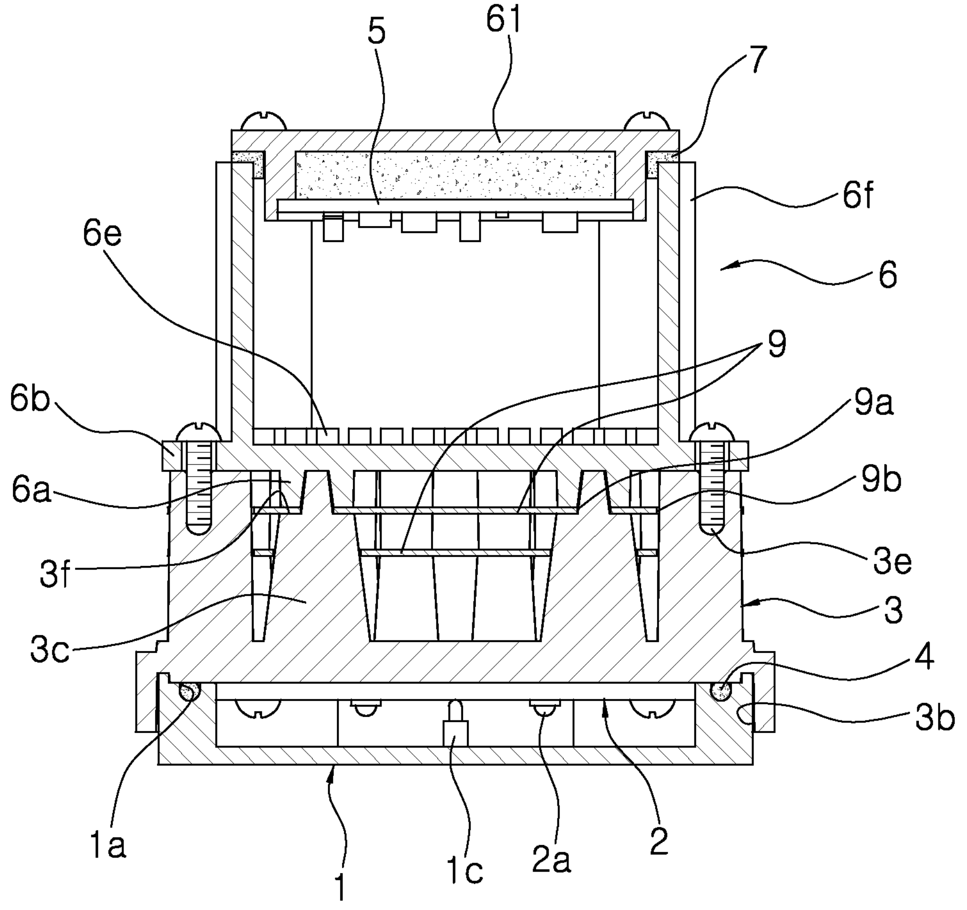
FIG. 4A is a front sectional view of an LED-type illuminating module according to the present invention.
Figure 4B:
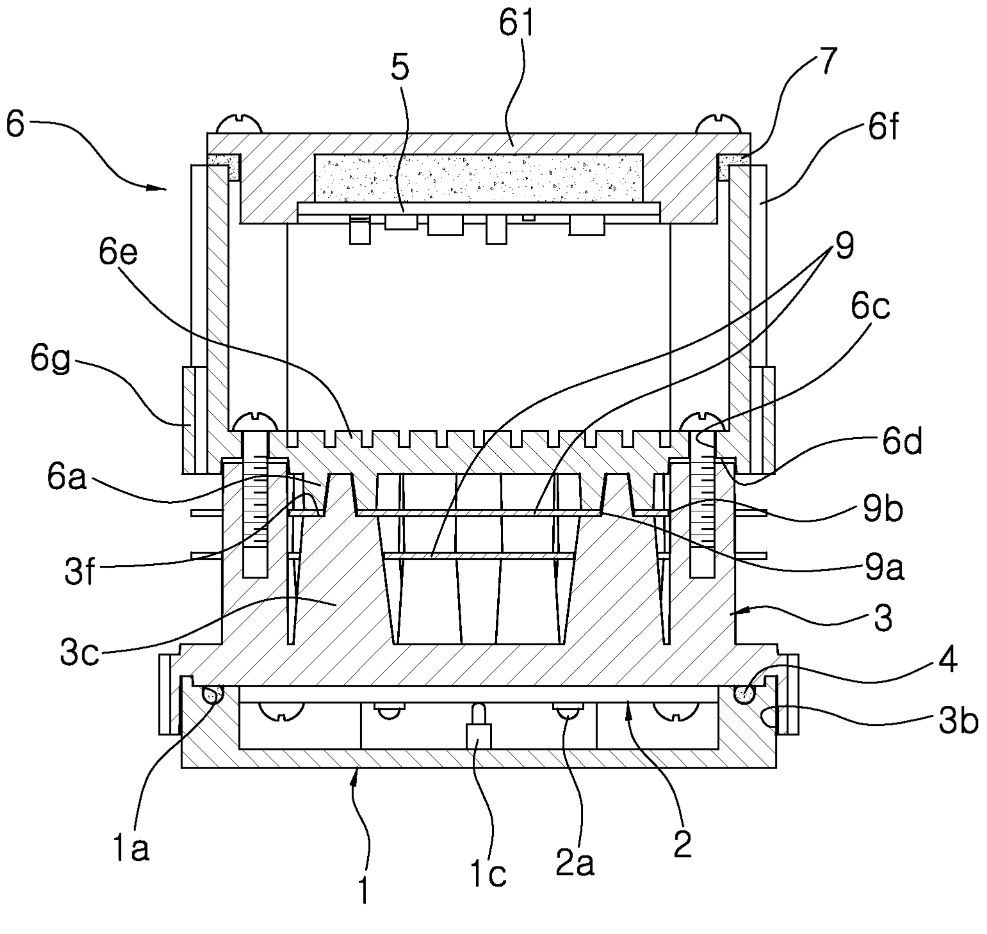
FIG. 4B is a side sectional view of an LED-type illuminating module according to the present invention.

Further, if necessary, the light transmission or diffusion plate 1 may be further provided at the center thereof with a deformation control rod 1*c*. Thus, when the light transmission or diffusion plate 1 is coupled with the radiator 3, the deformation control rod 1*c* presses and supports the center of the LED substrate 2 as shown in FIGS. 4A and 4B, so that the LED substrate 2, which is made of aluminum, is thermally expanded by the heat generated from the LEDs 2*a*, thereby preventing the LED substrate 2 from protruding from the bottom of the radiator 3 to the light transmission or diffusion plate 1.

The LED substrate 2 is configured such that LEDs 2*a* are fixed thereon at regular intervals by soldering depending on luminous intensity. Such an LED substrate 2 is fixed in a groove 3*b* formed on the bottom of a body 3*a* of the radiator 3 by screws, thus functioning to generate the light necessary for illumination when power is supplied from the power supply converter 5 provided in the housing 6.

Meanwhile, unlike a conventional radiator, the radiator 3 is formed by die-casting a light metal alloy having thermal diffusivity about 1.7 times higher than that of aluminum and a specific gravity at least 30% lower than that of aluminum. The body 3*a* of the radiator 3 is provided with cylindrical or conical radiating rods 3*c* at the top thereof, is provided with a groove for mounting the LED substrate 2 and the light transmission or diffusion plate 1 at the bottom thereof, and is provided with ultrasonically-fused protrusion passing holes 3*d* at the corners thereof. That is, the radiator 3 is configured to surround the top of the light transmission or diffusion plate 1 together with the LED substrate 2, and its primary function is to radiate the heat generated from the LEDs 2*a*.

In this case, among the radiating rods 3*c* of the radiator 3, each of the cylindrical radiating rods is provided with a screw coupling hole 3*e* through which screws pass to detachably mount the housing 6. Each of the conical radiating rods is provided with a support 3*f* for supporting the lowermost radiating plate 9 at the middle portion and is provided with a support 3*f* for supporting upper radiating plates 9.

Each of the radiating plates 9, like the radiator 3, is made of a light metal alloy, is formed in a radial pattern and is provided with holes 9*a* and recesses 9*b* for passing radiating rods and supporting rods. The radiating plates 9 are flush with the body 3*a* of the radiator 3 and are fixed in steps by the radiating rods 3*c*, thus serving to secondarily radiate the heat primarily radiated by the radiator 3.

In this case, the light metal alloy constituting the radiator 2 and the radiating plates 9 may be a magnesium alloy having a thermal diffusion coefficient of 1.3-1.4 [$cm^2$/sec], a thermal conductivity of 220-240 [W/mK], a density of 1.8±0.3 [g/$cm^3$], a melting point of 595 [°C.] and a specific heat of 1.02-1.05 [J/gK], compared to aluminum having a thermal diffusion coefficient of 0.84 [$cm^2$/sec], a thermal conductivity of 60-90 [W/mK], a density of 2.7 [g/$cm^3$], a melting point of 600-660 [°C.] and a specific heat of 0.9 [J/gK]. Further, the radiator 2 and the radiating plates 9 may be formed of any one of beryllium, titanium, duralumin and a carbon-aluminum composite material.

As such, when the radiator 3 and the radiating plates 9 are formed of a magnesium alloy or any one light metal alloy of beryllium, titanium, duralumin and a carbon-aluminum composite material, the radiator has a density of 1.8±0.3 [g/$cm^3$] and a specific heat of 1.02-1.05 [J/gK], which is lower than aluminum having a density of 2.7 [g/$cm^3$] and a specific heat of 0.9 [J/gK], has a thermal diffusion coefficient of 1.3-1.4 [$cm^2$/sec], which is higher than aluminum having a thermal diffusion coefficient of 0.84 [$cm^2$/sec], and has a thermal conductivity of 60-90 [W/mK], which is lower than aluminum having a thermal conductivity of 220-240 [W/mK]. Therefore, the radiator 3 formed of a magnesium alloy exhibits its high thermal electron emission performance at a small surface area compared to a radiator formed of aluminum. Thus, when the radiator 3 is formed of a magnesium alloy which is one of the light metal alloys, the weight and size of the radiator 3 can be greatly reduced compared to a radiator formed of aluminum.

Further, in the present invention, when the radiator 3 is formed by die-casting a magnesium alloy, if necessary, radiating protrusions 3*g* may be formed at regular intervals along the periphery of the body 3*a* of the radiator 3, so that the radiating surface area of the radiator 3 can be increased, with the result that the volume of the radiator 3 can be decreased under the same conditions, thereby effectively miniaturizing the LED-type illuminating module.

Further, the number of the radiating plates 9 is changed depending on the design aim or structure of the LED-type illuminating module of the present invention and the capacity of a single LED-type illuminating module. For example, when the power consumption of the LED-type illuminating module is 8 [W], the radiating plates 9 may not be provided because the LED-type illuminating module is designed such that heat radiation can be sufficiently conducted only by integrating the radiator with radiating rods; when the power consumption of the LED-type illuminating module is 9-10 [W], the LED-type illuminating module is designed such that one radiating plate 9 is provided; when the power consumption of the LED-type illuminating module is 10-12 [W], the LED-type illuminating module is designed such that two radiating plates 9 are provided; and when the power consumption of the LED-type illuminating module is 14 [W], the LED-type illuminating module is designed such that three radiating plates 9 are provided.

Therefore, at the time of designing the LED-type illuminating module, the number of the radiating plates 9 mounted on the radiator 3, the shape of the radiating rods of the radiator 3 and the shape of the housing 6 can be determined depending on the capacity of various illuminating apparatuses to which it is to be applied.

Further, the waterproof ring 4 is formed of rubber or silicon, and is inserted into the waterproof ring inserting groove 1*a* formed at the periphery of the top of the light transmission or diffusion plate 1. The waterproof ring 4 functions to prevent various foreign materials as well as water from being introduced by sealing the gap between the light transmission or diffusion plate 1 and the body 3*a* of the radiator 3.

Figure 3:
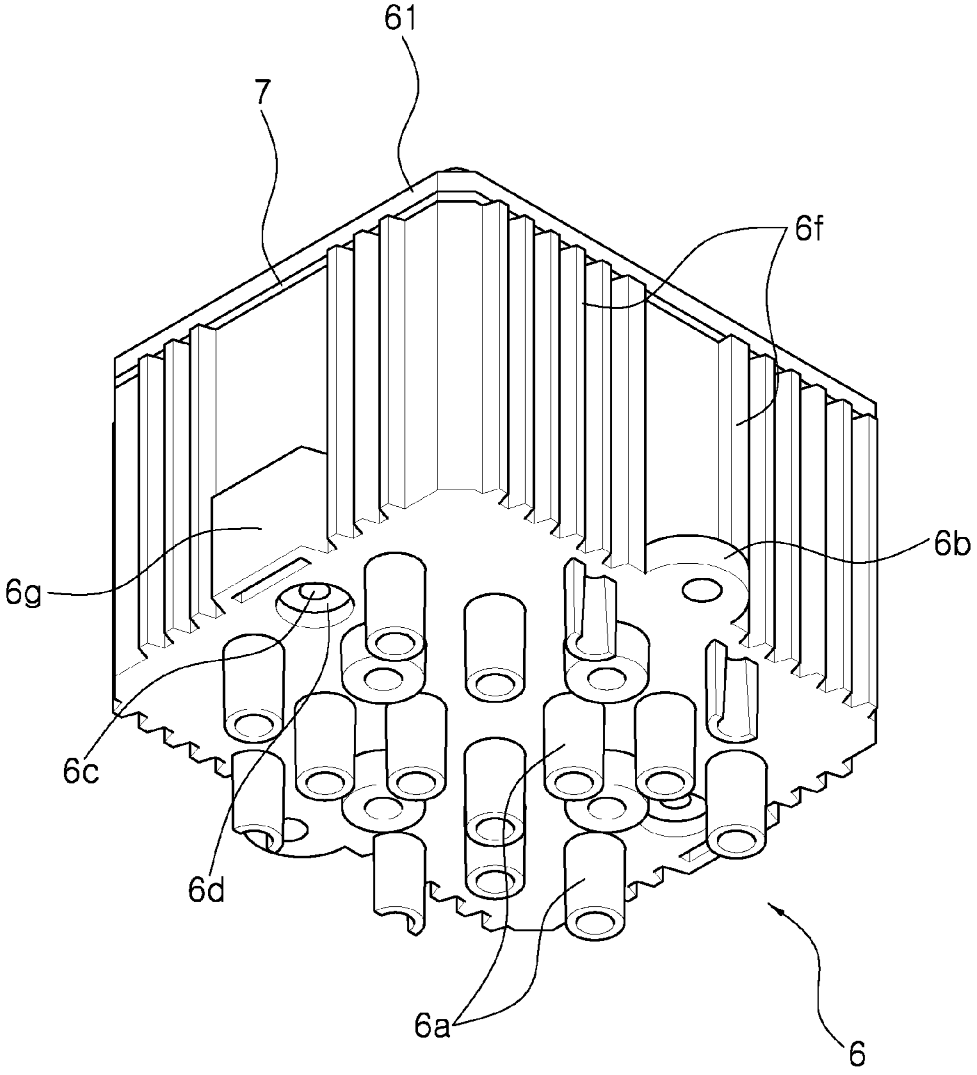
FIG. 3 is a perspective view of an assembled housing according to the present invention.

Meanwhile, as shown in FIG. 3, the housing 6 is formed by injection-molding a conductive polymer resin material into a square shape having a cover 61, and is detachably coupled with the radiating rods 3*c* and the radiation plates 9. The housing 6 serves to radiate the heat generated from the power supply converter 5 accommodated therein and the heat transferred from the radiator 3 and the radiation plates 9.

Further, in the present invention, in order to couple the housing 6 with the radiator 3 and to completely fix the radiating plates 9, the radiating plates 9 supported by the supports 3*f* of the radiating rods 3*c* are pressed and supported at those positions corresponding to the conical radiating rods 3*c* on the bottom of the housing 6 as shown in FIGS. 4A and 4B, and pushrods 6*a* having two or more heights are formed on the bottom of the housing 6 such that the radiating plates 9 are vertically disposed at regular intervals and fixed between the radiator 3 and the housing 6, and a pair of screw coupler 6*b* and a pair of screw passing holes 6*c* are formed at the positions corresponding to the cylindrical radiating rods 3*c* on the lateral sides of the housing 6 such that the housing 6 is integrally coupled with the radiator 3 by screws.

Further, in the present invention, among the radiating rods 3*c*, two cylindrical radiating rods, which are connected with screws through the screw passing hole 6*c*, are formed such that their heights are larger than those of other radiating rods, and radiating rod inserting grooves 6*d* are further formed at the bottom of the housing 6 coming into contact with the two cylindrical radiating rods such that the end of each of the radiating rods 3*c* is inserted into each of the radiating rod inserting grooves 6*d* so that the housing 6 does not have to rotate. In this case, since it is possible to prevent the housing from rotating when the housing 6 is coupled with the radiator 3, coupling the housing 6 with the radiator 3 is easy.

In this case, when the bottom of the housing 6 is thin, there are problems in that the heat radiation effect is deteriorated and in that strength is decreased. Therefore, in the present invention, lattice-shaped ribs 6*e* are formed at the inner bottom of the housing 6 in order to enhance the strength of pushrods 6*a* and increase the heat radiation area of the housing 6.

Further, the power supply converter 5, which is provided in the LED-type illuminating module, is attached to the cover 61 of the housing 6, and serves to supply the power necessary to drive LEDs 2*a* mounted on the LED substrate 2.

Meanwhile, a conductive polymer resin material containing carbon nanotubes (CNTs) is used to form the housing 6 and the cover 61 using injection-molding. The carbon nanotubes (CNTs) have a density of 1.4±0.2 [g/cm$^3$] and specific heat of 1.1±0.4 [J/gK], which is smaller than aluminum having a density of 2.7 [g/cm$^3$] and a specific heat of 0.9 [J/gK], and has a thermal diffusion coefficient of 0.75-0.8 [cm$^2$/sec], which is similar to aluminum having a thermal diffusion coefficient of 0.84 [cm$^2$/sec]. Therefore, the housing 6 formed of a conductive polymer resin material containing carbon nanotubes (CNTs) exhibits high thermal electron emission performance at a small surface area compared to a housing formed of aluminum. Thus, when the housing 6 is formed of a conductive polymer resin material containing carbon nanotubes (CNTs), the weight and size of the housing can be decreased, and the production cost thereof can also be reduced, compared to a housing formed of aluminum or iron.

Moreover, in the present invention, when the housing 6 is formed by injection-molding a conductive polymer resin material containing carbon nanotubes (CNTs), if necessary, radiating protrusions 6*f* may be further formed at regular intervals along the periphery of the housing 6, so that the radiating surface area of the housing 6 can be increased, with the result that the volume of the housing 6 can be decreased under the same conditions, thereby further decreasing the size and weight of the LED-type illuminating module.

Further, the waterproof packing 7 is formed of rubber or silicon, and is provided between the periphery of the top of the housing 6 and the periphery of the bottom of the cover 61. Therefore, the waterproof packing 7 can prevent various foreign materials as well as water from gaining entry into the housing 6 provided therein with the power supply converter 5, thus greatly improving the insulation properties of the housing 6 vis-à-vis the power supply converter 5.

The average material properties, such as a thermal diffusion coefficient, thermal conductivity, density, a melting point, specific heat and the like, of aluminum, an aluminum alloy, a magnesium alloy and a conductive polymer resin material containing carbon nanotubes (CNTs) were compared, and the results thereof are given in Table 1 below.

TABLE 1

| Item | Unit | Conductive polymer resin material | Magnesium (Mg) alloy | Aluminum (Al) | Aluminum alloy (A380) | Carbon-aluminum composite material (ALC400/Japan) |
|---|---|---|---|---|---|---|
| Thermal diffusion coefficient | [cm$^2$/sec] | 0.7-0.8 | 1.3-1.4 | 0.84 | 0.8 ± 0.05 | 2.55 |
| Thermal conductivity | [W/mK] | 90-150 | 60-90 | 220-240 | 100-160 | 425 |
| Density | [g/cm$^3$] | 1.4 ± 0.3 | 1.8 ± 0.3 | 2.7 | 2.74 | 2.3 |
| Melting point | [° C.] | 105-160 | 595 | 600-660 | 595 | 800-820 |
| Specific heat | [J/gK] | 1.1 ± 0.4 | 1.02-1.05 | 0.9 | 1.26 | 0.75 |

Here, thermal conductivity is the phenomenon of heat being transferred from a high temperature area to a low temperature area without mass transfer. The heat transfer rate in the body is proportional to the temperature gradient (temperature difference per unit length) in the body, but changes depending on the kind of material.

Further, in terms of the average material properties given in Table 1 above, when describing the influence of these average material properties on radiation action and radiation performance, the following are true: a higher "thermal diffusion coefficient" is advantageous because the heat radiation surface area can be reduced; a higher "thermal conductivity" is advantageous because the section area necessary for thermal contact and thermal electron movement can be reduced; and, a lower "density and specific heat" is advantageous because the surface area, volume and weight of the radiating structure (that is, radiator and housing) can be reduced.

Further, briefly explaining the materials given in Table 1 above, the "conductive polymer resin material containing carbon nanotubes (CNTs)" was first made commercially available from DuPont Corp. in U.S.A, and was then developed and used by Denker Corp. and Unitika Ltd. in Japan and Nextech Corp. and Acol Green Corp. in Korea, and, currently, is receiving considerable attention as a novel material. The "magnesium alloy" has been generally used in the fields of automobiles, bicycles, aircraft and space, and is currently applied to various types of heat radiation structures requiring light weight with the improvement of alloying, molding and surface-treatment technologies, but is barely used in the field of LED illumination.

Since "aluminum" and the "aluminum alloy" are commonly-used heat radiating material, descriptions thereof are omitted. However, the aluminum alloy, compared to pure aluminum, is advantageous in that it can be formed in various shapes, but is disadvantageous in that its thermal diffusion rate (the rate of discharging heat to the air) becomes low because its specific heat [J/gK] is very large, and its volume and weight increases.

The "carbon-aluminum composite material" was developed and commercially used by NASA in U.S.A and AM Technology Corp. in Japan, and is a composite material formed by impregnating carbon with aluminum. The carbon-aluminum composite material has high heat radiation performance, but is employed only in high-grade products due to the problem of price competitiveness. However, it is predicted that the price thereof will fall greatly because it is being developed and commercially available from Posco in Korea and several companies in Taiwan and China, and thus it is also being predicted that the application range thereof will become large.

For example, heat is very rapidly transferred by an electrical conductor such as copper, iron or the like, but is very slowly transferred by an electrical insulator such as sulfur, plastic or the like. Further, heat is slowly transferred by liquids or gases compared to solids. The reason for this is because the heat transfer mechanism of each material is different. Therefore, the thermal conductivity of a material is defined by the amount of heat passing through a material layer having a thickness of 1 cm and an area of 1 $cm^2$ for 1 sec wherein the difference in temperature between both sides thereof is 1° C.

Generally, the thermal conductivity of a material changes depending on temperature, but may be a material constant determined depending on the kind of the material. In 1853, G. H. Bidemann and R. Frantz found the fact that the thermal conductivity of a metal is proportional to the electrical conductivity thereof and the ratio of the thermal conductivity thereof to the electrical conductivity thereof is constant without regard to the kind of metal. This is called "Bidemann-Frantz's law".

As such, the thermal conduction of metals occurs because free electrons transport heat from a high-temperature area to a low-temperature area in the form of kinetic energy. For this reason, the thermal conductivity of metals is high, and the thermal conductivity thereof and the electrical conductivity thereof are interrelated. It is known that, when the temperature becomes higher, thermal conductivity becomes somewhat low because the movement of free electrons is inhibited by the thermal vibration of a crystal lattice. Meanwhile, in the case of a dielectric (insulator), the waves caused by the vibration of atoms and molecules generated from a part of the dielectric are reflected from the surface of the dielectric to form a stationary wave, and the energy of the stationary wave uniformly increases the internal energy of the dielectric, thus transferring heat.

Accordingly, in the present invention, in order to reduce the weight, size and production cost of a radiation structure of the radiator 3 and the radiating plates 9, the radiation structure may be designed as follows. That is, since the radiation structure is formed of a magnesium alloy having low thermal conductivity and high thermal diffusivity, the radiation structure is designed such that the section area of the heat transfer passage thereof is increased by 40~60 [%] of that of the heat transfer passage of a radiation structure formed of an aluminum alloy in order to increase the thermal conductivity thereof. Further, since a magnesium alloy has high thermal diffusivity, the radiation structure may be designed such that the surface area thereof is decreased by 30~50 [%] of that of a radiation structure formed of an aluminum alloy, air can be charged and discharged in all directions in order to improve ventilation and the radiation structure is exposed to the outside.

Figure 8:
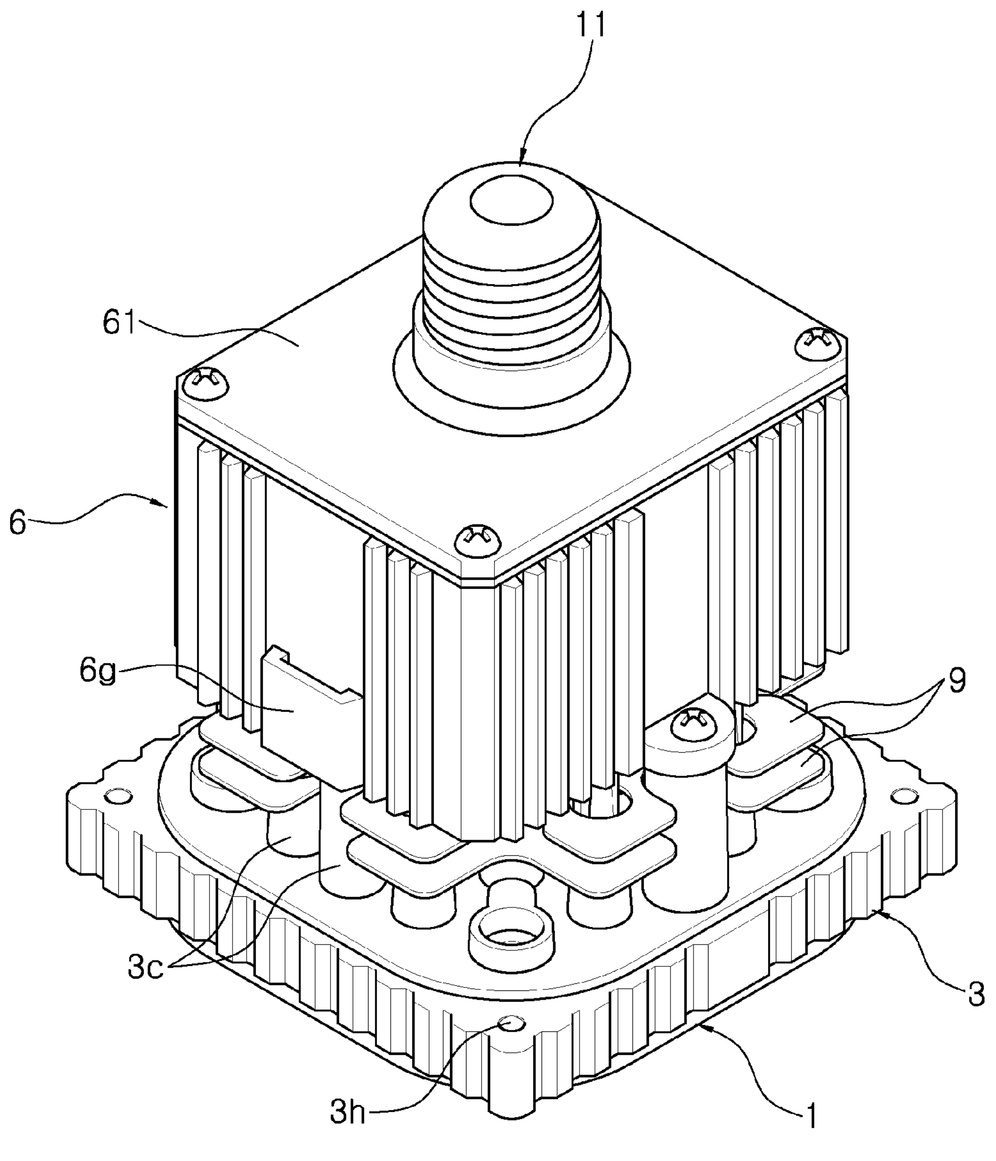
FIG. 8 is a perspective view of an illuminating apparatus including an LED-type illuminating module provided with a threaded plug at the top thereof.

Meanwhile, in the present invention, when a single LED-type illuminating module is to be used as an illuminating apparatus that can be screwed into a socket, as shown in FIG. 8, a threaded plug 11, which is similar to that of a bulb, is integrally provided at the center of the top of the cover 61 of the housing 6 using an adhesive having both insulative and adhesive properties, so that an alternating voltage can be easily supplied to the power supply converter 5 provided in the housing 6 by the thread plug 11, and the single LED-type illuminating module can be used as a lamp of an illumination apparatus such as a light for stairs, a light for sign boards, a downlight or the like by screwing the single LED-type illuminating module into a socket.

Further, in the present invention, screw inserting grooves **3*h* are formed at regular intervals along the periphery of the body 3*a* of the radiator 3** or at the corners.

Figure 5:
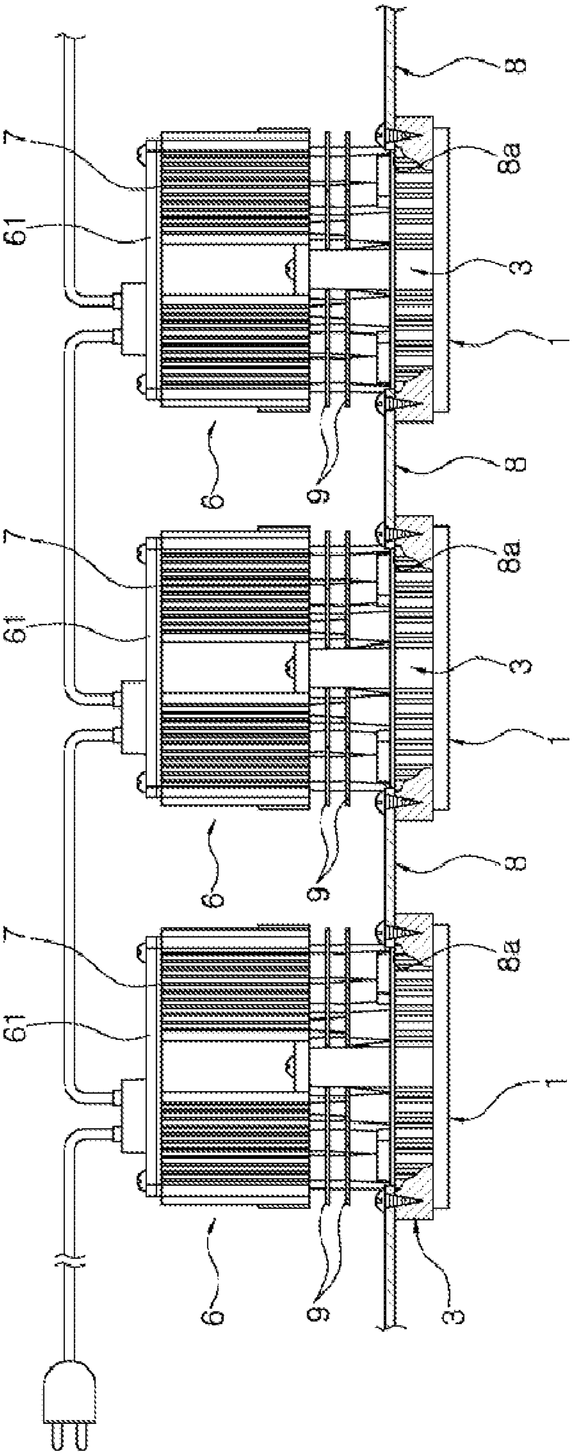
FIG. 5 is a partially-enlarged front view of an illuminating apparatus which is composed of a plurality of LED-type illuminating modules according to the present invention and in which alternating-current power supply lines are connected with each other.
Figure 9:
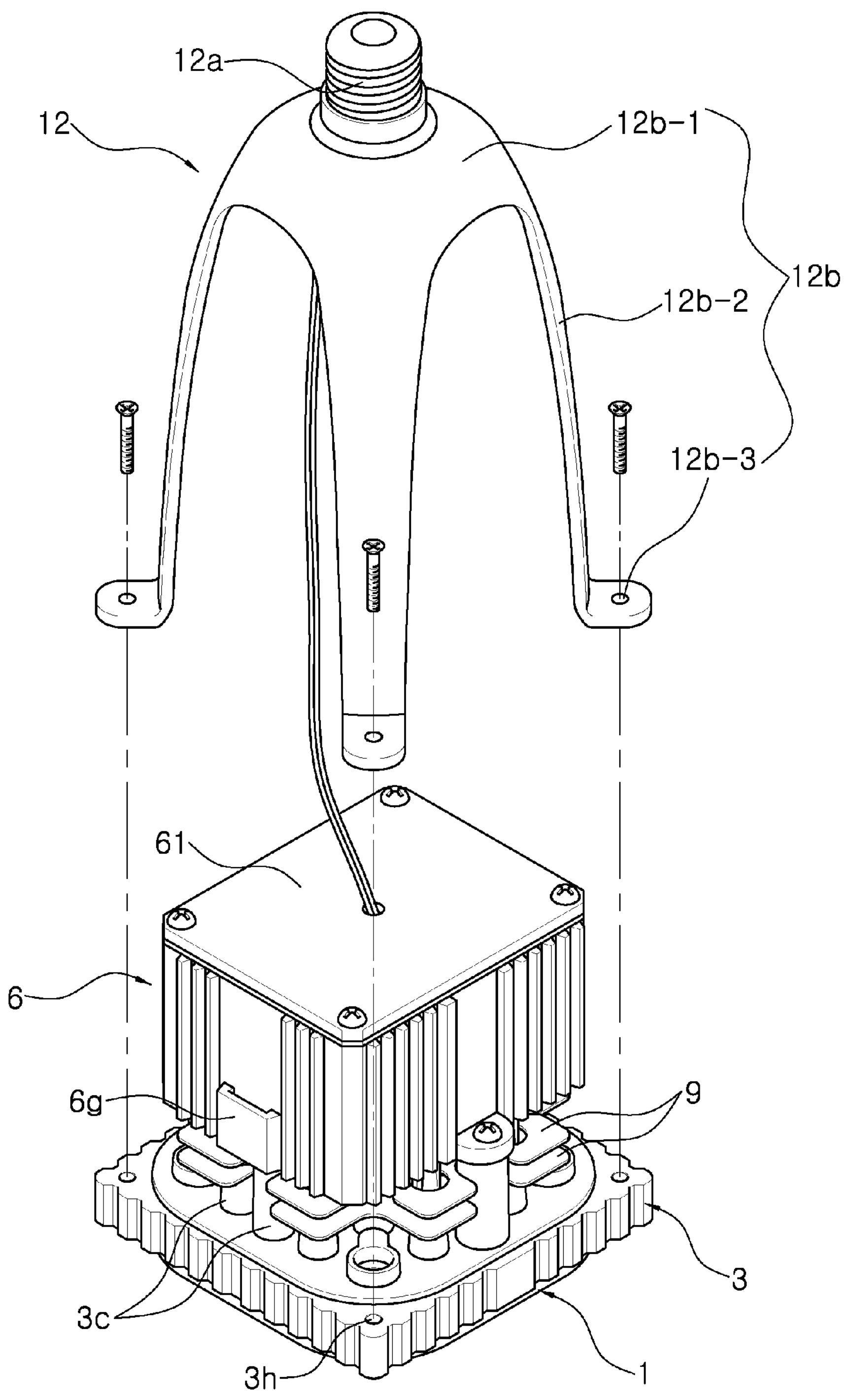
FIG. 9 is an exploded perspective view of a single illuminating apparatus including an LED-type illuminating module provided with a threaded plug-combined ventilation support.

That is, the screw inserting grooves **3*h* are formed at regular intervals along the periphery of the body 3*a* of the radiator 3 or at the corners such that, when the LED-type illuminating modules assembled into an illuminating apparatus such as a floodlight, a security light, a light for spectacles, a light for houses or cattle pens, a light for factories or the like, each of the LED-type illuminating modules is fixed on the module fixing plate 8 by inserting a part of the body 3*a* of the radiator 3 into a radiator mounting hole 8*a* formed on the module fixing plate 8 and simultaneously fixing the body 3*a* of the radiator 3 using screws as shown in FIG. 5 or by fixing a thread plug-combined ventilation support 12 having a predetermined shape on the radiator 3 as shown in FIG. 9**.

Figure 10:
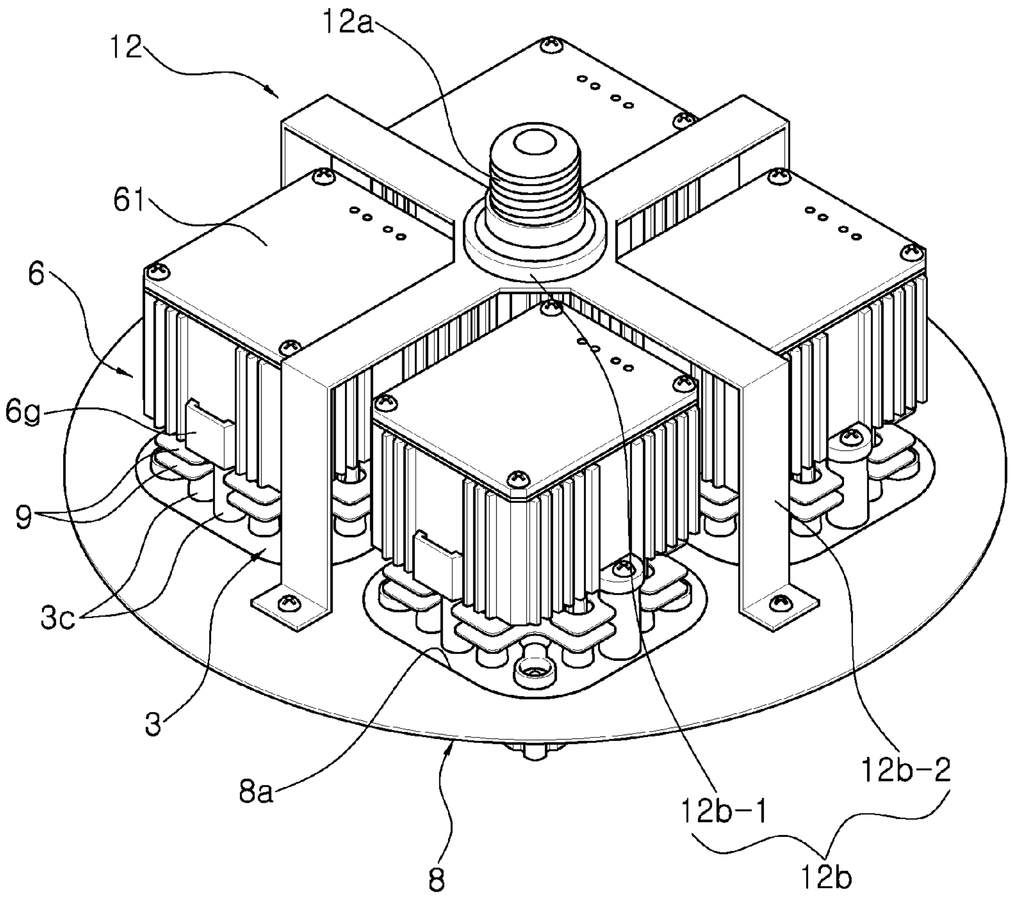
FIG. 10 is a perspective view of a high-power illuminating apparatus formed by fixing a plurality of LED-type illuminating modules on a module fixing plate and providing a thread plug-combined ventilation support.

In this case, as shown in FIGS. 9 and 10, the thread plug-combined ventilation support 12 includes a threaded plug **12*a* and a ventilation support 12*b* formed of synthetic resin and metal. The threaded plug 12*a* functions to supply an alternating voltage to the power supply converter 5 and to integrally provide a single LED-type illuminating module or several LED-type illuminating modules on the module fixing plate 8 by screwing the threaded plug 12*a* into a socket. The ventilation support 12*b* includes a body 12*b*-1 integrally attached to the bottom of the threaded plug 12*a* and a plurality of legs 12*b*-2 integrally formed downwards along the periphery of the body 12*b*-1 at regular intervals. Each of the legs 12*b*-2 is provided at the lower end thereof with a screw passing hole 12*b*-3 through which the ventilation support 12*b* is fixed on the radiator 3 or the module fixing plate 8** by a screw.

Figure 13A:
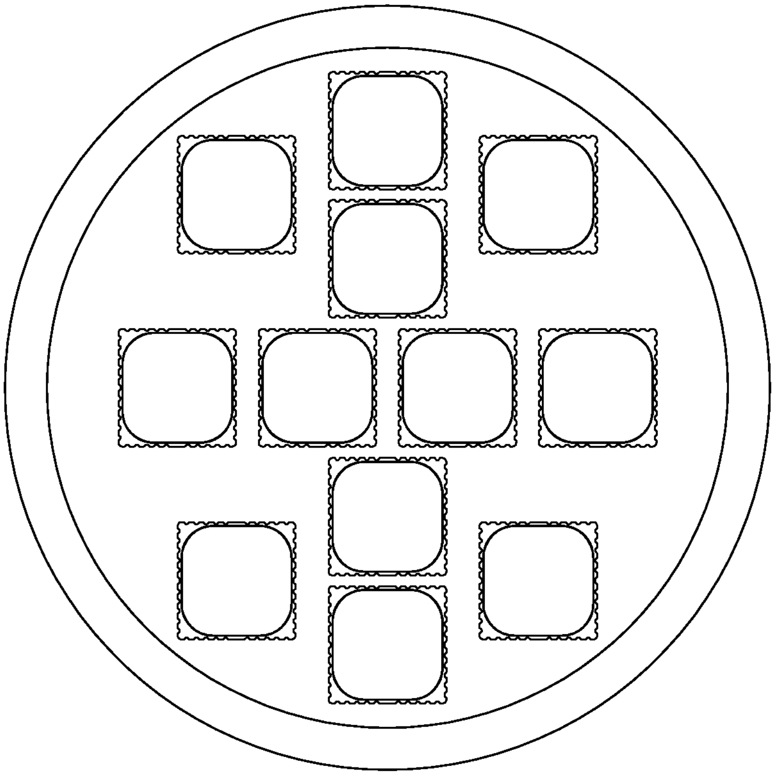
FIG. 13A is a bottom view illustrating a floodlight having a circular reflector (for example, a light for a factory, a ceiling or the like) which is manufactured using the LED-type illuminating module of the present invention.
Figure 13B:
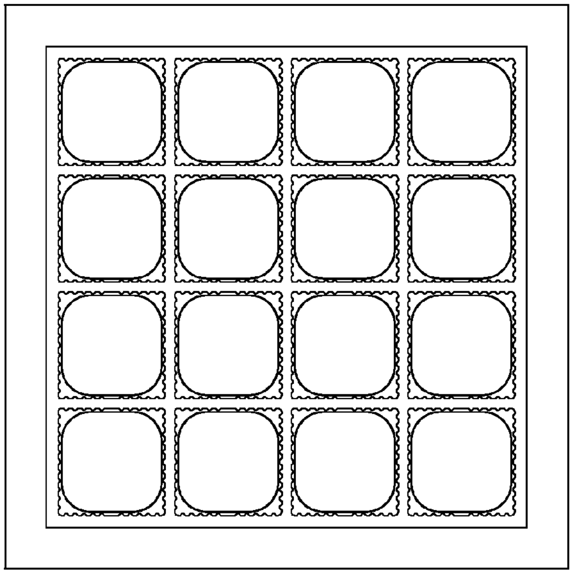
FIG. 13B is a bottom view illustrating a square floodlight (for example, a light for a playground, a golf course, a harbor, a stage or the like) which is manufactured using the LED-type illuminating module of the present invention.

Therefore, since the thread plug-combined ventilation support 12 can be screwed in a socket such that a single LED-type illuminating module or several LED-type illuminating modules are integrally provided on the module fixing plate 8 in a state in which the radiation performance of the radiator 3 and the housing 6 are not influenced (or air flow is not hindered) by the thread plug-combined ventilation support 12, the LED-type illuminating module provided with the thread plug-combined ventilation support 12 can be used as a lamp of an illumination apparatus such as a light for stairs, a light for sign boards, a downlight or the like as shown in FIG. 9. Further, when several LED-type illuminating modules are integrally provided on the module fixing plate 8, the LED-type illuminating modules provided with the thread plug-combined ventilation support 12 can be used as a high-power illuminating apparatus such as a floodlight, a security light, a light for spectacles, a light for houses or cattle pens, a light for factories or the like as shown in FIG. 10 and FIGS. 13A and 13B.

That is, when the thread plug-combined ventilation support 12 is coupled with one LED-type illuminating module as shown in FIG. 9, the LED-type illuminating module provided with the thread plug-combined ventilation support 12 can be used as a lamp of an illumination apparatus such as a light for stairs, a light for sign boards, a downlight or the like. Further, when the thread plug-combined ventilation support 12 is coupled with the module fixing plate provided with several LED-type illuminating modules, the LED-type illuminating modules provided with the thread plug-combined ventilation support 12 can be used as a high-power illuminating apparatus such as a floodlight, a security light, a light for spectacles, a light for houses or cattle pens, a light for factories or the like as shown in FIG. 10.

Meanwhile, in the present invention, the housing is integrally provided with open box-shaped protrusions **6*g* at both lower sides thereof. In order to fabricate a high-power LED-type illuminating apparatus such as a floodlight, a security light, a light for spectacles, a light for houses or cattle pens, a light for factories or the like by fixing several LED-type illuminating modules on the module fixing plate 8, the LED-type illuminating modules may be fixed on the module fixing plate 8 by connecting the elastic fastener 13 with the open box-shaped protrusion as shown in FIGS. 6A and 6B and FIGS. 7A and 7B. Further, in order to control the light angle of a single LED-type illumination module, a lighting angle control unit 14 may be coupled with the single LED-type illumination module by connecting the lighting angle control unit 14 with the open box-shaped protrusion 6***g* as shown in FIGS. 11A and 11B.

Figure 6A:
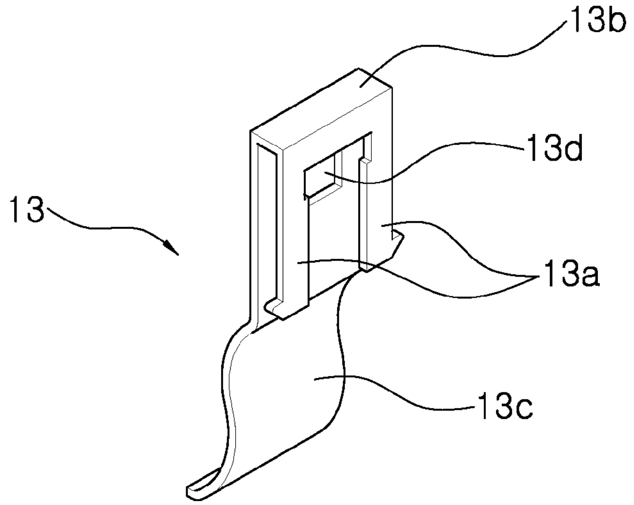
FIG. 6A is a perspective view of an elastic fastener according to an embodiment of the present invention.

In this case, as shown in FIG. 6A, the elastic fastener 13 may be configured such that a π-shaped elastic part 13*a*, a flat part 13*b* and a plate spring part 13*c* are integrally formed. Further, as shown in FIG. 7A, the elastic fastener 13 may be configured such that a pair of hooks 13*e*, a pair of flat parts 13*f*, a pair of spacing parts 13*g* and a pair of spring parts 13*h* are integrally formed using a steel wire of a predetermined diameter and length.

Figure 6B:
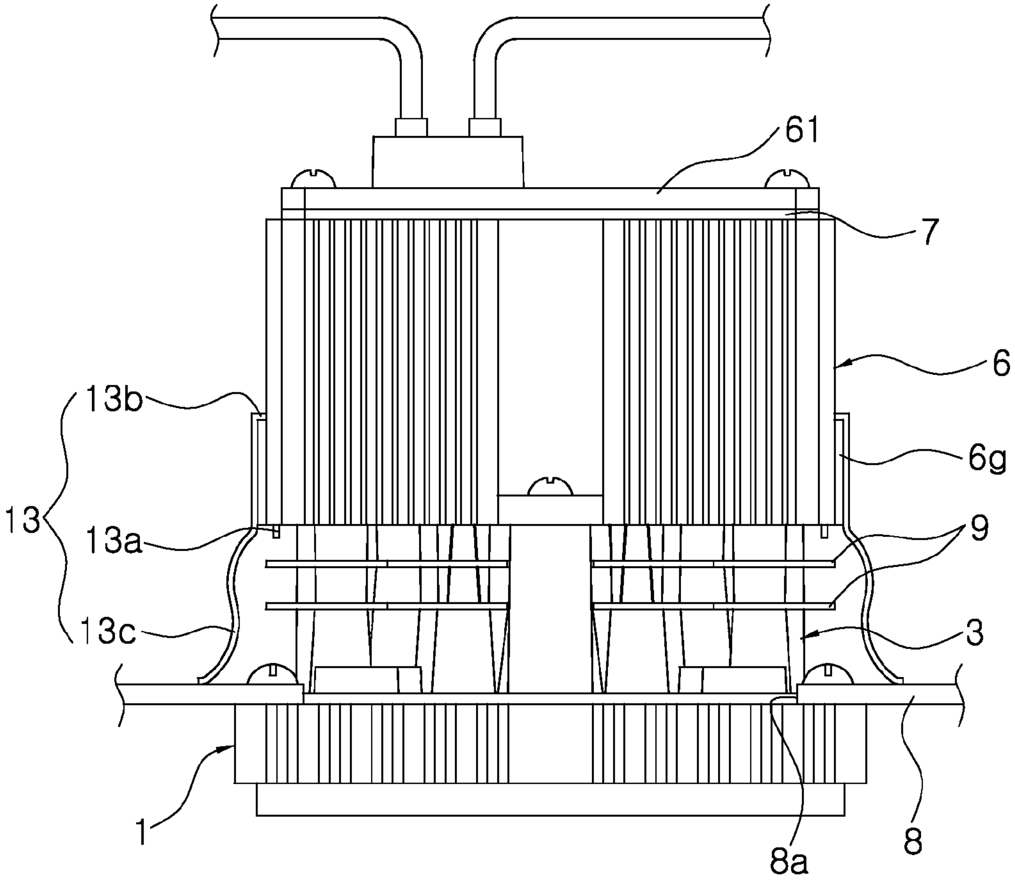
FIG. 6B is partially-enlarged front view of an LED-type illuminating module fixed by the elastic fastener.

Among the two types of elastic fasteners 13, the elastic fastener 13 shown in FIG. 6A, which is curvedly formed using a steel sheet of a predetermined width and length, is configured such that the π-shaped elastic part 13*a*, which is to be inserted into the open box-shaped protrusion 6*g*, is integrally formed at the inner side of the flat part 13*b*, and the plate spring part 13*c*, the lower end of which is to be elastically attached to the module fixing plate 8 with it curved as shown in FIG. 6B, is integrally formed at the outer side of the flat part 13*b*. In this case, if necessary, the plate spring part 13*c* may be provided with a tool inserting hole 13*d* for disassembly at the upper portion thereof.

When each of the radiators 3 is inserted into the radiator mounting hole 8*a* formed on the module fixing plate 8 using the above-shaped elastic fastener 13 to mount LED-type illuminating modules on the module fixing plate and then the π-shaped elastic part 13*a* of the elastic fastener 13 is inserted into the open box-shaped protrusion 6*g* formed at both lateral sides of the housing 6, the protrusions of the π-shaped elastic part 13*a* are latched and fixed at both lower sides of the open box-shaped protrusion 6*g*, and simultaneously the plate spring part 13*c* curvedly connected to one end of the flat part cover the outer side of each of the open box-shaped protrusions 6*g*, and the lower end of the plate spring part 13*c* is elastically attached to the module fixing plate 8 with it curved as shown in FIG. 6B, so that the LED-type illuminating modules can be completely fixed on the module fixing plate 8, and it is possible to easily perform the work of fixing the LED-type illuminating modules on the module fixing plate 8.

Figure 7A:
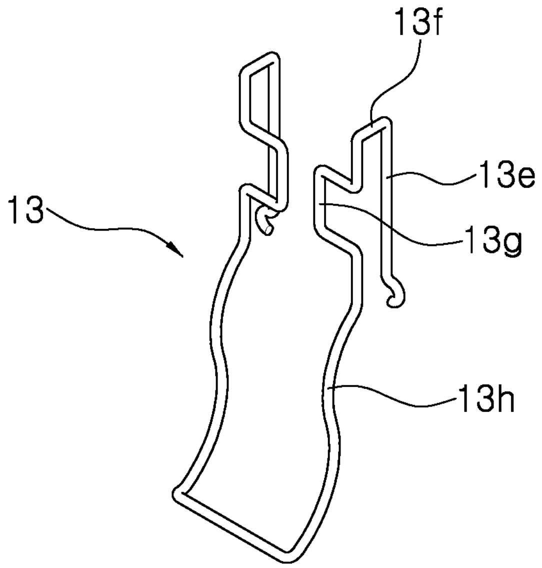
FIG. 7A is a perspective view of an elastic fastener according to another embodiment of the present invention.

Further, among the two types of elastic fasteners 13, the elastic fastener 13 shown in FIG. 7A, which is curvedly formed using a steel wire having predetermined diameter and length, includes: a pair of hooks 13*e* inserted into the open box-shaped protrusion 6*g*; a pair of flat parts 13*f* located at the top thereof and covering the upper portion of the open box-shaped protrusion 6*g*; a pair of spacing parts 13*g* allowing the hooks 13*e* to be spaced apart from each other by a predetermined distance; and a pair of spring parts 13*h*, the lower end of which is elastically attached to the module fixing plate 8 with it curved.

Figure 7B:
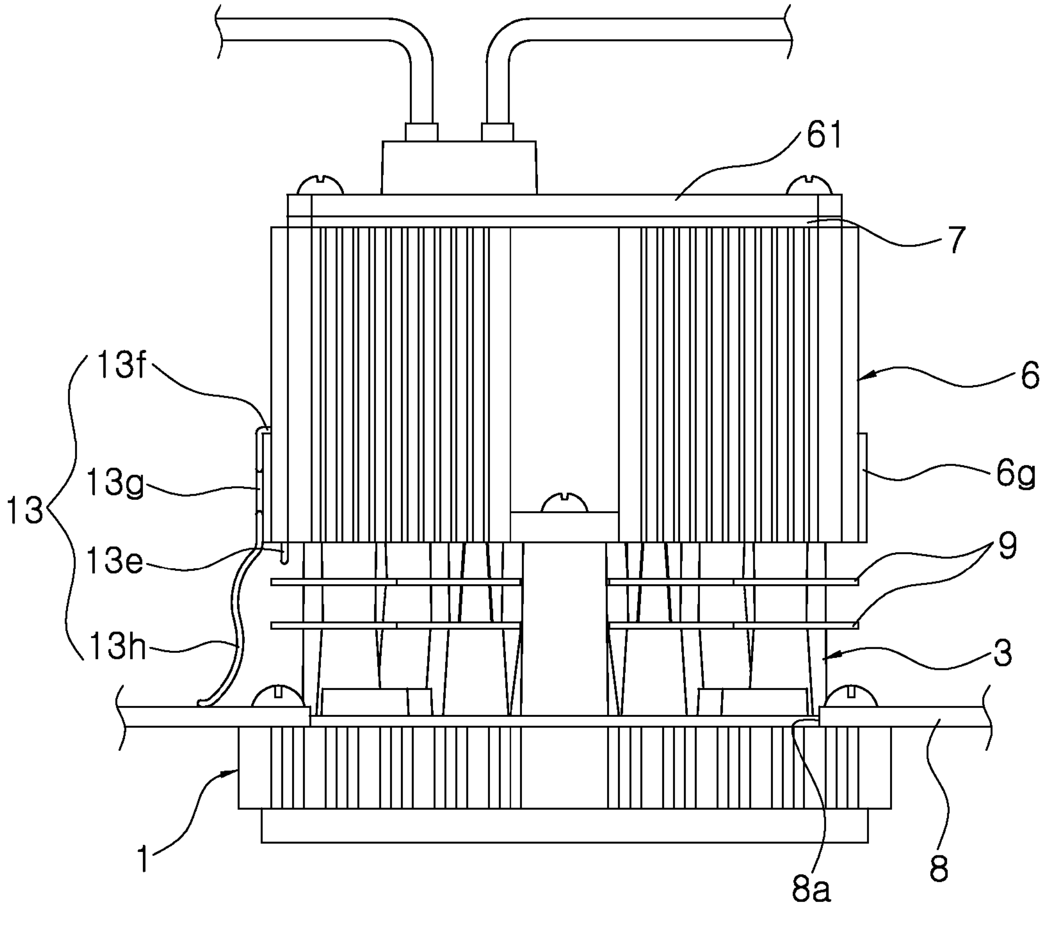
FIG. 7B is a partially-enlarged front view of an LED-type illuminating module fixed by the elastic fastener.

Even when a pair of hooks 13*e* are inserted into the open box-shaped protrusions 6*g* of the housing 6 in order to mount LED-type illuminating modules on the module fixing plate 8, the pair of hooks 13*e* are latched and fixed at both lower sides of the open box-shaped protrusions 6*g*, and simultaneously a pair of spacing parts 13*g* curvedly formed at the ends of a pair of flat parts 13*f* and a part of a pair of spring parts 13*h* cover the outer side of each of the open box-shaped protrusions 6*g*, and the other part of the pair of spring parts 13*h* is elastically attached to the module fixing plate 8 with it curved as shown in FIG. 7B, so that the LED-type illuminating modules can be completely fixed on the module fixing plate 8, and it is possible to easily perform the work of fixing the LED-type illuminating modules on the module fixing plate 8.

Figure 11:
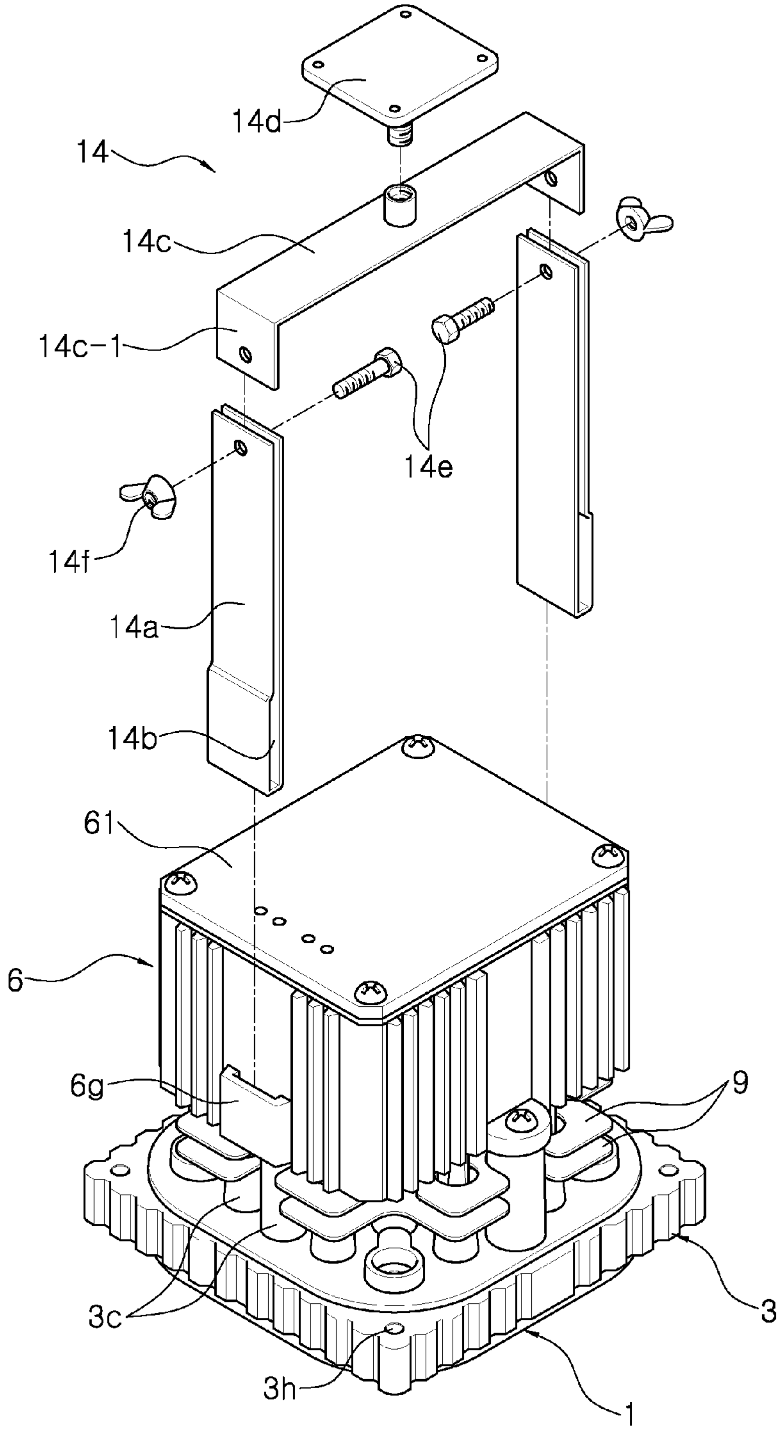
FIG. 11 is an exploded perspective view of an illuminating apparatus including an LED-type illuminating module provided with a lighting angle control unit.

Meanwhile, as shown in FIG. 11, the lighting angle control unit 14 includes a pair of elastic fasteners 14*a*, a support 14*c* and a fixing plate 14*d*. Here, each of the elastic fasteners 14*a* is formed by bending a steel sheet having predetermined width and length in a U-shape, and a coupling part 14*b* is integrally provided at the lower portion thereof which is inserted into the open box-shaped protrusion 6*g* of the housing 6. Each of elastic fasteners 14*a* is detachably coupled with the open box-shaped protrusion 6*g* of the housing 6.

Further, the support 14*c* is formed by bending a steel sheet having predetermined width and length in an open box-shape, and is integrally provided at both ends thereof with connecting parts 14*c*-1. Each of the connecting parts 14*c*-1 is inserted between the free ends of each of the elastic fasteners 14*a* to be connected with the elastic fastener 14*a* such that its angle can be controlled using a bolt 14*e* and a butterfly nut 14*f*. Further, the fixing plate 14*d* is detachably fixed on the center of the support 14*c*, and serves to detachably fix the lighting angle control unit 14 and the LED-type illuminating module on a wall or the like.

Figure 12:
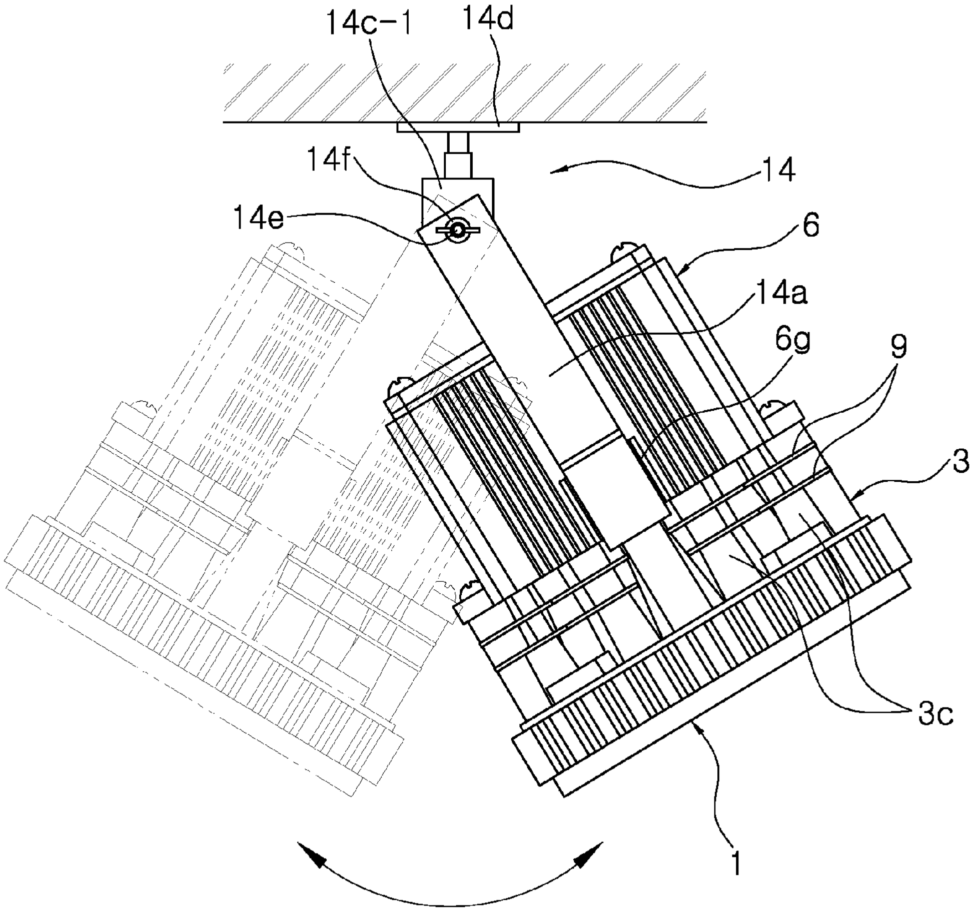
FIG. 12 is a side view showing a state of controlling the lighting angle of an illuminating apparatus using the lighting angle control unit.

As such, in the lighting angle control unit 14, the butterfly nut 14*f* provided at the connection part of the elastic fastener 14*a* and the support is loosened, and then the position of the LED-type illuminating module is adjusted to the desired angle using the bolt 14*e* as a hinge as shown in FIG. 12, thus setting the desired lighting angle of the LED-type illuminating module, and then the butterfly nut 14*f* is tightened. Therefore, it is preferred that this LED-type illuminating module be applied to a light for sign boards, a light for spectacles or the like.

Meanwhile, FIG. 13A is a bottom view illustrating a floodlight having a circular reflector (for example, a light for a factory, a ceiling or the like) which is manufactured using the LED-type illuminating module of the present invention, and FIG. 13B is a bottom view illustrating a square floodlight (for example, a light for a playground, a golf course, a harbor, a stage or the like) which is manufactured using the LED-type illuminating module of the present invention.

Figure 14A:
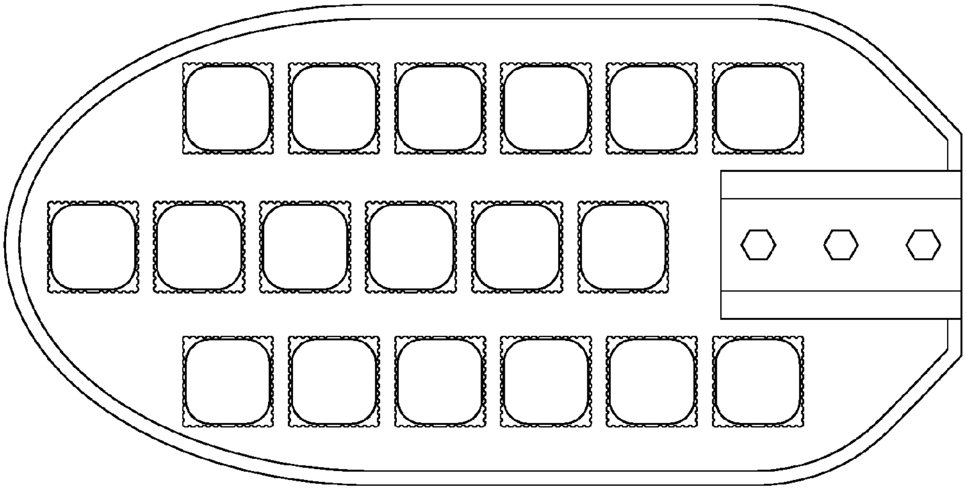
FIG. 14A is a bottom view illustrating a street light which is manufactured using the LED-type illuminating module of the present invention.
Figure 14B:
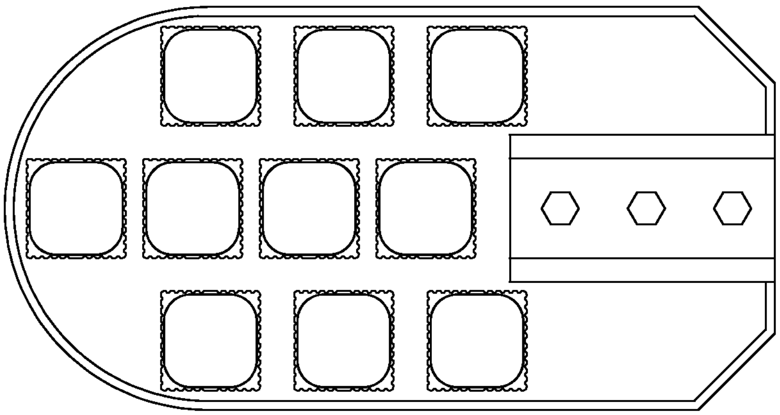
FIG. 14B is a bottom view illustrating a security light which is manufactured using the LED-type illuminating module of the present invention.

Further, FIG. 14A is a bottom view illustrating a street light (180 W) which is manufactured using the LED-type illuminating module of the present invention, and FIG. 14B is a bottom view illustrating a security light (100 W) which is manufactured using the LED-type illuminating module of the present invention.

As described above, according to the LED-type illuminating module of the present invention, high-power light emitting diodes (LEDs) having high light efficiency, a small LED disposition area and a high power per LED are used as a light source, a radiating structure for radiating the heat generated from the high power LEDs is composed of a radiating body and a plurality of radiating fins, and the radiating structure, including the radiating body and the radiating fins provided in steps around the radiating body, is made of a magnesium alloy that is a light metal alloy having a thermal diffusivity 1.7 times higher than that of aluminum, thereby providing a small high-power LED-type illuminating module, so that users can easily fabricate mid- or high-power illuminating apparatuses having a power of several tens of watts to several hundreds of watts and can use these illumination devices, and the radiation can be carried out in steps by the radiating body and the plurality of radiating fins, with the result that the radiation performance of the high-power LED-type illuminating module can be greatly improved, and the volume of the high-power LED-type illuminating module can be greatly reduced, thereby decreasing the size and weight thereof and greatly decreasing the production cost thereof, and, particularly, when a relatively high-power illuminating apparatus such as a floodlight, security light or the like is fabricated using the LED-type high-power illuminating modules, only a necessary number of the LED-type high-power illuminating modules are directly installed in a support, a reflector, a case or the like to obtain the desired illumination output, thus greatly reducing the production cost thereof and preventing resources from being wasted.

Further, according to the LED-type illuminating module of the present invention, a housing accommodating a power supply converter is directly and detachably mounted on the top of a radiating body, and the housing is formed by injection-molding a conductive polymer resin containing carbon nanotubes (CNTs) having very high thermal conductivity, so that the heat generated from the power supply converter accommodated in the housing can be easily radiated, and the residual heat in the light emitting diodes (LEDs) can also be radiated by the housing, thereby reducing the production cost of the LED-type illuminating module and decreasing the weight and size thereof.

Furthermore, according to the LED-type illuminating module, in the case of such high-power illuminating apparatuses as floodlight, security lights, street lights, lights for houses or cattle pens, lights for factories and the like requiring several LED-type illuminating modules, each of the LED-type illuminating modules is easily fixed on a module plate using elastic fasteners, and in the case of such high-power illumination devices as lights for stairs, lights for spectacles, lights for sign boards, downlights and the like requiring that one LED-type illuminating module be installed in the form of a bulb, a spiral socket is easily fixed and mounted on the housing or a light transmission or diffusion plate, so that the compatibility of the LED-type illuminating module can be improved, thereby applying the LED-type illuminating module to various kinds of illuminating apparatuses.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An illuminating apparatus comprising one or more LED-type illuminating modules, each of the one or more LED-type illuminating modules comprising:

a radiator radiating heat generated from LEDs and formed of a light metal alloy, the radiator including a body having ultrasonically-fused protrusion passing holes at corners of the body through which ultrasonically-fused protrusions pass, cylindrical radiating rods disposed on a top of the body, each of the cylindrical radiating rods having a screw coupling hole, and conical radiating rods disposed on the top of the body and having supports in a middle portion of the conical radiating rods;

a light transmission and diffusion plate mounted in a bottom of the radiator by ultrasonic fusion-bonding and transmitting and diffusing light emitted from the LEDs;

an LED substrate including the LEDs and mounted in the bottom of the radiator by screws;

a waterproof ring sealing a gap between the light transmission and diffusion plate and the radiator;

radiating plates formed of the light metal alloy in a radial pattern for radiating the heat generated from the LEDs and having holes and recesses for receiving the conical radiating rods, the conical radiating rods supporting the radiating plates such that the radiating plates are in spaced apart steps by the supports of the conical radiating rods and in parallel with the body of the radiator;

a housing including a cover on a top of the housing, push-rods in a bottom of the housing, a pair of screw couplers on a first pair of outer walls of the housing and a pair of screw passing holes in the bottom of the housing, the housing being formed by injection-molding a conductive polymer resin material in a square shape and detachably coupled with the cylindrical radiating rods and the radiating plates to radiate heat transferred from the radiator and the radiating plates;

a waterproof packing provided between the housing and the cover to seal the housing; and a power supply converter provided in the housing and supplying power necessary to drive the LEDs mounted on the LED substrate.

2. The illuminating apparatus according to claim 1, wherein the light transmission and diffusion plate is formed by injection-molding polycarbonate (PC) or polymethylmethacrylate (PMMA).

3. The illuminating apparatus according to claim 1, wherein the light transmission and diffusing plate includes a deformation control rod at a center of the light transmission and diffusing plate for preventing the LED substrate from being protruded from the bottom of the radiator towards the light transmission and diffusion plate by thermal expansion of the LED substrate.

4. The illuminating apparatus according to claim 1, wherein the cylindrical radiating rods includes two cylindrical radiating rods having heights greater than those of the other cylindrical radiating rods, the two cylindrical radiating rods are connected with the housing by screws that pass through the pair of screw passing holes, and radiating rod inserting grooves are formed at the bottom of the housing so that an end of each of the two cylindrical radiating rods is inserted into each of the radiating rod inserting grooves.

5. The illuminating apparatus according to claim 1, wherein the light metal alloy is a magnesium alloy having a thermal diffusion coefficient of 1.3-1.4 [$cm^2$/sec], a thermal conductivity of 60-90 [W/mK], a density of 1.8±0.3 [g/$cm^3$], a melting point of 595 [°C.] and a specific heat of 1.02-1.05 [J/gK].

6. The illuminating apparatus according to claim 1, wherein the conductive polymer resin material contains carbon nanotubes (CNTs) having a thermal diffusion coefficient of 0.75-0.8 [$cm^2$/sec], a thermal conductivity of 90-150 [W/mK], a density of 1.4±0.2 [g/$cm^3$], a melting point of 105-160 [°C.] and a specific heat of 1.1±0.4 [J/gK].

7. The LED-type illuminating module according to claim 1, wherein the cover of the housing is provided with a threaded plug at a center of the cover for supplying an alternating voltage to the power supply converter.

8. The illuminating apparatus according to claim 1, further comprising:

a module fixing plate for fixing said one or more LED-type illuminating modules; and a thread plug-combined ventilation support having a predetermined shape, wherein said each of the one or more LED-type illuminating modules is fixed on the module fixing plate by inserting a part of the body of the radiator into a radiator mounting hole formed on the module fixing plate and simultaneously by fixing with the thread plug-combined ventilation support.

9. The LED-type illuminating module according to claim 1, wherein the housing is integrally provided with open box-shaped protrusions on lower ends of a second pair of outer walls of the housing.

* * * * *